(12) United States Patent
Martinez et al.

(10) Patent No.: US 8,281,027 B2
(45) Date of Patent: Oct. 2, 2012

(54) SYSTEM AND METHOD FOR DISTRIBUTING MEDIA RELATED TO A LOCATION

(75) Inventors: Ronald Martinez, San Francisco, CA (US); Marc Eliot Davis, San Francisco, CA (US); Michael Spiegelman, Los Angeles, CA (US); Christopher T. Paretti, San Francisco, CA (US); Nicola Stefano Ghezzi, Santa Monica, CA (US); Christopher William Higgins, Portland, OR (US); Chris Kalaboukis, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 523 days.

(21) Appl. No.: 12/234,000

(22) Filed: Sep. 19, 2008

(65) Prior Publication Data

US 2010/0077017 A1 Mar. 25, 2010

(51) Int. Cl.
*G06F 15/16* (2006.01)
(52) U.S. Cl. .......................... 709/231; 709/203; 709/227
(58) Field of Classification Search .................. 709/203, 709/227, 231
See application file for complete search history.

(56) References Cited

U.S. PATENT DOCUMENTS

| | | | |
|---|---|---|---|
| 5,446,891 A | 8/1995 | Kaplan et al. |
| 5,493,692 A | 2/1996 | Theimer et al. |
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |
| 5,835,087 A | 11/1998 | Herz |
| 5,903,848 A | 5/1999 | Takahashi |
| 5,920,854 A | 7/1999 | Kirsch et al. |

(Continued)

FOREIGN PATENT DOCUMENTS

EP 1362302 11/2003

(Continued)

OTHER PUBLICATIONS

Nedos, A; Singh K., Clarke S, "Proximity Based Group Communications for Mobile Ad Hoc Networks"; Proximity-Based Group Communication; Global Smart Spaces; D.14; Oct. 3, 2003; 31 pages.

(Continued)

*Primary Examiner* — Emmanuel L Moise
*Assistant Examiner* — Waseem Ashraf
(74) *Attorney, Agent, or Firm* — James J. DeCarlo; Greenburg Traurig, LLP

(57) ABSTRACT

A system and method for distributing media related to a location. The physical location of a media presentation device is received over a network. The physical location of a plurality of end users are identified, via the network, wherein each of plurality of users is associated with a user device capable of storing media files. At least one of the end users is identified who is located in such proximity to the media presentation device that the user can perceive media that presented on the media presentation device. At least one media file that is currently being presented on the media presentation device is identified and transmitted over the network to each of the identified end users.

66 Claims, 16 Drawing Sheets

U.S. PATENT DOCUMENTS

| | | | |
|---|---|---|---|
| 6,014,638 A | 1/2000 | Burge et al. | |
| 6,021,403 A | 2/2000 | Horvitz et al. | |
| 6,047,234 A | 4/2000 | Cherveny et al. | |
| 6,098,065 A | 8/2000 | Skillen et al. | |
| 6,112,181 A | 8/2000 | Shear et al. | |
| 6,157,924 A | 12/2000 | Austin | |
| 6,169,992 B1 | 1/2001 | Beall et al. | |
| 6,212,552 B1 | 4/2001 | Biliris et al. | |
| 6,266,667 B1 | 7/2001 | Olsson | |
| 6,314,365 B1 | 11/2001 | Smith | |
| 6,314,399 B1 | 11/2001 | Deligne et al. | |
| 6,324,519 B1 | 11/2001 | Eldering | |
| 6,327,590 B1 | 12/2001 | Chidlovskii et al. | |
| 6,446,065 B1 | 9/2002 | Nishioka et al. | |
| 6,490,698 B1 | 12/2002 | Horvitz et al. | |
| 6,502,033 B1 | 12/2002 | Phuyal | |
| 6,523,172 B1 | 2/2003 | Martinez-Guerra et al. | |
| 6,571,279 B1 | 5/2003 | Herz et al. | |
| 6,601,012 B1 | 7/2003 | Horvitz et al. | |
| 6,662,195 B1 | 12/2003 | Langseth et al. | |
| 6,665,640 B1 | 12/2003 | Bennett et al. | |
| 6,694,316 B1 | 2/2004 | Langseth et al. | |
| 6,701,311 B2 | 3/2004 | Biebesheimer et al. | |
| 6,701,315 B1 | 3/2004 | Austin | |
| 6,708,203 B1 | 3/2004 | Makar et al. | |
| 6,731,940 B1 | 5/2004 | Nagendran | |
| 6,741,980 B1 | 5/2004 | Langseth et al. | |
| 6,757,661 B1 | 6/2004 | Blaser et al. | |
| 6,773,344 B1 | 8/2004 | Gabai et al. | |
| 6,781,920 B2 | 8/2004 | Bates et al. | |
| 6,785,670 B1 | 8/2004 | Chiang et al. | |
| 6,789,073 B1 | 9/2004 | Lunenfeld | |
| 6,813,501 B2 | 11/2004 | Kinnunen et al. | |
| 6,816,850 B2 | 11/2004 | Culliss | |
| 6,829,333 B1 | 12/2004 | Frazier | |
| 6,834,195 B2 | 12/2004 | Brandenberg et al. | |
| 6,842,761 B2 | 1/2005 | Diamond et al. | |
| 6,845,370 B2 | 1/2005 | Burkey et al. | |
| 6,850,252 B1 | 2/2005 | Hoffberg | |
| 6,853,913 B2 | 2/2005 | Cherveny et al. | |
| 6,853,982 B2 | 2/2005 | Smith et al. | |
| 6,882,977 B1 | 4/2005 | Miller | |
| 6,904,160 B2 | 6/2005 | Burgess | |
| 6,931,254 B1 * | 8/2005 | Egner et al. | 455/456.3 |
| 6,961,660 B2 | 11/2005 | Underbrink et al. | |
| 6,961,731 B2 | 11/2005 | Holbrook | |
| 6,985,839 B1 | 1/2006 | Motamedi et al. | |
| 7,010,492 B1 | 3/2006 | Bassett et al. | |
| 7,027,801 B1 | 4/2006 | Hall et al. | |
| 7,058,508 B2 | 6/2006 | Combs et al. | |
| 7,058,626 B1 | 6/2006 | Pan et al. | |
| 7,062,510 B1 | 6/2006 | Eldering | |
| 7,065,345 B2 | 6/2006 | Carlton et al. | |
| 7,065,483 B2 | 6/2006 | Decary et al. | |
| 7,069,308 B2 | 6/2006 | Abrams | |
| 7,073,129 B1 | 7/2006 | Robarts et al. | |
| 7,110,776 B2 | 9/2006 | Sambin | |
| 7,143,091 B2 | 11/2006 | Charnock et al. | |
| 7,149,696 B2 | 12/2006 | Shimizu et al. | |
| 7,181,438 B1 | 2/2007 | Szabo | |
| 7,185,286 B2 | 2/2007 | Zondervan | |
| 7,194,512 B1 | 3/2007 | Creemer et al. | |
| 7,203,597 B2 | 4/2007 | Sato et al. | |
| 7,209,915 B1 | 4/2007 | Taboada et al. | |
| 7,219,013 B1 | 5/2007 | Young et al. | |
| 7,236,969 B1 | 6/2007 | Skillen et al. | |
| 7,254,581 B2 | 8/2007 | Johnson et al. | |
| 7,257,570 B2 | 8/2007 | Riise et al. | |
| 7,305,445 B2 | 12/2007 | Singh et al. | |
| 7,320,025 B1 | 1/2008 | Steinberg et al. | |
| 7,343,364 B2 | 3/2008 | Bram et al. | |
| 7,395,507 B2 | 7/2008 | Robarts et al. | |
| 7,404,084 B2 * | 7/2008 | Fransdonk | 713/176 |
| 7,437,312 B2 | 10/2008 | Bhatia et al. | |
| 7,451,102 B2 | 11/2008 | Nowak | |
| 7,461,168 B1 | 12/2008 | Wan | |
| 7,496,548 B1 | 2/2009 | Ershov | |
| 7,522,995 B2 | 4/2009 | Nortrup | |
| 7,529,811 B2 | 5/2009 | Thompson | |
| 7,562,122 B2 | 7/2009 | Oliver et al. | |
| 7,577,665 B2 | 8/2009 | Rameer et al. | |
| 7,584,215 B2 | 9/2009 | Saari et al. | |
| 7,624,104 B2 | 11/2009 | Berkhin et al. | |
| 7,624,146 B1 | 11/2009 | Brogne et al. | |
| 7,634,465 B2 | 12/2009 | Sareen et al. | |
| 7,657,907 B2 | 2/2010 | Fennan et al. | |
| 7,681,147 B2 | 3/2010 | Richardson-Bunbury et al. | |
| 7,725,492 B2 | 5/2010 | Sittig et al. | |
| 7,729,901 B2 | 6/2010 | Richardson-Bunbury et al. | |
| 7,769,740 B2 | 8/2010 | Martinez | |
| 7,769,745 B2 | 8/2010 | Naaman | |
| 7,783,622 B1 | 8/2010 | Vandermolen et al. | |
| 7,792,040 B2 | 9/2010 | Nair | |
| 7,802,724 B1 * | 9/2010 | Nohr | 235/384 |
| 7,822,871 B2 * | 10/2010 | Stolorz et al. | 709/238 |
| 7,831,586 B2 | 11/2010 | Reitter et al. | |
| 7,853,474 B2 * | 12/2010 | Ullah | 705/7.31 |
| 7,865,308 B2 | 1/2011 | Athsani et al. | |
| 7,925,708 B2 | 4/2011 | Davis | |
| 2001/0013009 A1 | 8/2001 | Greening et al. | |
| 2001/0035880 A1 | 11/2001 | Musatov et al. | |
| 2001/0047384 A1 | 11/2001 | Croy | |
| 2001/0052058 A1 | 12/2001 | Ohran | |
| 2002/0014742 A1 | 2/2002 | Conte et al. | |
| 2002/0019849 A1 | 2/2002 | Tuvey et al. | |
| 2002/0019857 A1 | 2/2002 | Harjanto | |
| 2002/0023091 A1 | 2/2002 | Silberberg et al. | |
| 2002/0023230 A1 | 2/2002 | Bolnick et al. | |
| 2002/0035605 A1 | 3/2002 | McDowell et al. | |
| 2002/0049968 A1 * | 4/2002 | Wilson et al. | 725/35 |
| 2002/0052786 A1 | 5/2002 | Kim et al. | |
| 2002/0052875 A1 | 5/2002 | Smith et al. | |
| 2002/0054089 A1 | 5/2002 | Nicholas | |
| 2002/0065844 A1 | 5/2002 | Robinson et al. | |
| 2002/0069218 A1 | 6/2002 | Sull et al. | |
| 2002/0099695 A1 | 7/2002 | Abajian et al. | |
| 2002/0103870 A1 | 8/2002 | Shouji | |
| 2002/0111956 A1 | 8/2002 | Yeo et al. | |
| 2002/0112035 A1 | 8/2002 | Carey | |
| 2002/0133400 A1 | 9/2002 | Terry et al. | |
| 2002/0138331 A1 | 9/2002 | Hosea et al. | |
| 2002/0152267 A1 | 10/2002 | Lennon | |
| 2002/0169840 A1 | 11/2002 | Sheldon et al. | |
| 2002/0173971 A1 | 11/2002 | Stirpe et al. | |
| 2002/0178161 A1 | 11/2002 | Brezin et al. | |
| 2002/0198786 A1 | 12/2002 | Tripp et al. | |
| 2003/0008661 A1 * | 1/2003 | Joyce et al. | 455/456 |
| 2003/0009367 A1 | 1/2003 | Morrison | |
| 2003/0009495 A1 | 1/2003 | Adjaoute | |
| 2003/0027558 A1 | 2/2003 | Eisinger | |
| 2003/0032409 A1 | 2/2003 | Hutcheson et al. | |
| 2003/0033331 A1 | 2/2003 | Sena et al. | |
| 2003/0033394 A1 | 2/2003 | Stine et al. | |
| 2003/0065762 A1 * | 4/2003 | Stolorz et al. | 709/223 |
| 2003/0069877 A1 | 4/2003 | Grefenstette et al. | |
| 2003/0069880 A1 | 4/2003 | Harrison et al. | |
| 2003/0078978 A1 | 4/2003 | Lardin et al. | |
| 2003/0080992 A1 | 5/2003 | Haines | |
| 2003/0126250 A1 | 7/2003 | Jhanji | |
| 2003/0149574 A1 | 8/2003 | Rudman | |
| 2003/0154293 A1 * | 8/2003 | Zmolek | 709/228 |
| 2003/0165241 A1 * | 9/2003 | Fransdonk | 380/258 |
| 2003/0191816 A1 | 10/2003 | Landress et al. | |
| 2004/0010492 A1 | 1/2004 | Zhao et al. | |
| 2004/0015588 A1 | 1/2004 | Cotte | |
| 2004/0030798 A1 | 2/2004 | Andersson et al. | |
| 2004/0034752 A1 | 2/2004 | Ohran | |
| 2004/0043758 A1 | 3/2004 | Sorvari et al. | |
| 2004/0044736 A1 | 3/2004 | Austin-Lane et al. | |
| 2004/0070602 A1 | 4/2004 | Kobuya et al. | |
| 2004/0139025 A1 | 7/2004 | Coleman | |
| 2004/0139047 A1 | 7/2004 | Rechsteiner | |
| 2004/0148341 A1 | 7/2004 | Cotte | |
| 2004/0152477 A1 | 8/2004 | Wu et al. | |
| 2004/0183829 A1 | 9/2004 | Kontny et al. | |
| 2004/0201683 A1 | 10/2004 | Murashita et al. | |
| 2004/0203851 A1 | 10/2004 | Vetro et al. | |

| | | |
|---|---|---|
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan et al. |
| 2005/0149397 A1 | 7/2005 | Morgernstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 * | 4/2006 | Wang et al. .................... 707/3 |
| 2006/0085419 A1 | 4/2006 | Rosen |
| 2006/0089876 A1 | 4/2006 | Boys |
| 2006/0116924 A1 | 6/2006 | Angeles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 * | 8/2006 | Moore ......................... 709/223 |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 * | 10/2006 | Othmer et al. ................. 715/774 |
| 2006/0242139 A1 | 10/2006 | Butterfield et al. |
| 2006/0242178 A1 | 10/2006 | Butterfield et al. |
| 2006/0242259 A1 * | 10/2006 | Vallabh et al. ................. 709/217 |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 * | 3/2007 | McGary et al. ............ 455/414.1 |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 * | 7/2007 | Barnes ........................ 455/456.1 |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 * | 11/2007 | Tang et al. ................. 455/414.2 |
| 2007/0260508 A1 | 11/2007 | Barry et al. |
| 2007/0260604 A1 * | 11/2007 | Haeuser et al. .................... 707/9 |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 * | 1/2008 | Medved et al. ................ 709/203 |
| 2008/0026804 A1 | 1/2008 | Baray et al. |
| 2008/0028031 A1 | 1/2008 | Bailey et al. |
| 2008/0040283 A1 * | 2/2008 | Morris .......................... 705/59 |
| 2008/0046298 A1 | 2/2008 | Ben-Yehuda et al. |
| 2008/0070588 A1 * | 3/2008 | Morin ........................ 455/456.1 |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 * | 5/2008 | Norlander et al. ................. 726/1 |
| 2008/0133360 A1 * | 6/2008 | Ullah .............................. 705/14 |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0154720 A1 | 6/2008 | Gounares |
| 2008/0163284 A1 * | 7/2008 | Martinez et al. ................. 725/25 |
| 2008/0172632 A1 | 7/2008 | Stambaugh |
| 2008/0177706 A1 | 7/2008 | Yuen |
| 2008/0195620 A1 * | 8/2008 | Abanami et al. .................... 707/9 |
| 2008/0270579 A1 | 10/2008 | Herz et al. |
| 2008/0285886 A1 | 11/2008 | Allen |
| 2008/0300250 A1 | 12/2008 | Hardy et al. |
| 2008/0320001 A1 | 12/2008 | Gaddam |

| | | | |
|---|---|---|---|
| 2009/0005987 A1 | 1/2009 | Vengroff et al. | |
| 2009/0006336 A1* | 1/2009 | Forstall et al. | 707/3 |
| 2009/0012934 A1* | 1/2009 | Yerigan | 707/3 |
| 2009/0012965 A1* | 1/2009 | Franken | 707/10 |
| 2009/0043844 A1 | 2/2009 | Zimmet et al. | |
| 2009/0044132 A1 | 2/2009 | Combel et al. | |
| 2009/0063254 A1 | 3/2009 | Paul et al. | |
| 2009/0070186 A1* | 3/2009 | Buiten et al. | 705/10 |
| 2009/0073191 A1 | 3/2009 | Smith et al. | |
| 2009/0076889 A1 | 3/2009 | Jhanji | |
| 2009/0100052 A1 | 4/2009 | Stern et al. | |
| 2009/0106356 A1 | 4/2009 | Brase et al. | |
| 2009/0125517 A1 | 5/2009 | Krishnaswamy et al. | |
| 2009/0132941 A1 | 5/2009 | Pilskalns et al. | |
| 2009/0144141 A1 | 6/2009 | Dominowska et al. | |
| 2009/0150501 A1 | 6/2009 | Davis et al. | |
| 2009/0150507 A1 | 6/2009 | Davis et al. | |
| 2009/0165051 A1* | 6/2009 | Armaly | 725/40 |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1* | 8/2009 | Coffman et al. | 705/10 |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1* | 9/2009 | Strandell et al. | 709/203 |
| 2009/0248833 A1* | 10/2009 | Frazier | 709/217 |
| 2009/0249482 A1* | 10/2009 | Sarathy | 726/22 |
| 2009/0265431 A1 | 10/2009 | Janie et al. | |
| 2009/0281997 A1 | 11/2009 | Jain | |
| 2009/0299837 A1* | 12/2009 | Steelberg et al. | 705/14.4 |
| 2009/0313546 A1* | 12/2009 | Katpelly et al. | 715/723 |
| 2009/0320047 A1 | 12/2009 | Khan et al. | |
| 2009/0323519 A1 | 12/2009 | Pun | |
| 2009/0328087 A1* | 12/2009 | Higgins et al. | 725/10 |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0118025 A1 | 5/2010 | Smith et al. | |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |

FOREIGN PATENT DOCUMENTS

| | | |
|---|---|---|
| JP | 2002312559 | 10/2002 |
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

U.S. Appl. No. 12/273,259, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/952,007, filed Dec. 6, 2007, Davis.
U.S. Appl. No. 11/953,454, filed Dec. 10, 2007, Davis.
U.S. Appl. No. 11/953,494, filed Dec. 10, 2007, Davis.
U.S. Appl. No. 12/059,594, filed Mar. 31, 2008, Martinez.
U.S. Appl. No. 12/236,668, filed Sep. 24, 2008, Davis.
U.S. Appl. No. 12/057,943, filed Mar. 28, 2008, Martinez.
U.S. Appl. No. 12/057,878, filed Mar. 28, 2008, Martinez.
U.S. Appl. No. 11/969,751, filed Jan. 4, 2008, Martinez.
U.S. Appl. No. 12/163,249, filed Jun. 27, 2008, Kalaboukis.
U.S. Appl. No. 12/145,145, filed Jun. 24, 2008, Davis.
U.S. Appl. No. 12/182,813, filed Jul. 30, 2008, Higgins.
U.S. Appl. No. 12/182,969, filed Jun. 27, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/241,590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
Sanderson et al., Analyzing Geographic Queries; Department of Information Studies; University of Sheffield, UK; 2 pages.
U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
Almieda, R.B. et al. "A Community-Aware Search Engine," WWW2004, New York., NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.

Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.

Bharat, K. (Date Unknown). "SearchPad: Explicit Capture of Search Context to Support Web Search," located at <http://www9.org/w9cdrom/173/173.html >, last visited Aug. 1, 2007, 13 pages.

Budzik, J. et al. (2000). "User Interactions with Everyday Applications as Context for Just-in-Time Information Access," Proceeding of the 2000 Conference on Intelligent User Interfaces, eight pages.

Finkelstein, L. et al. (2001). "Placing Search in Context: The Concept Revisited," WWW/O, Hong Kong, May 2-5, 2001, pp. 406-414.

Freyne, J. et al. (2004). "Further Experiments on Collaborative Ranking in Community-Based Web Search," Artificial Intelligence Review, pp. 1-23.

Lieberman, H. (1995) "Letizia: An Agent that Assists Web Browsing," Proceedings of the Fourteenth International Joint Conference on Artificial Intelligence, Aug. 20-25, 1995, six pages.

Mitra, M. et al. (1998). "Improving Automatic Query Expansion," Proceedings of the AMC SIGIR, nine pages.

Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent...>, last visited Aug. 1, 2007, six pages.

Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.

Yahoo! Inc. (Dec. 7, 2005). "Yahoo! Widget Engine 3.0 Reference Manual Version 3.0," 300 pages.

U.S. Appl. No. 12/407,690, filed Mar. 19, 2009; 50 pages.

U.S. Appl. No. 12/407,681, filed Mar. 19, 2009; 56 pages.

International Search Report PCT/US2008/088228 dated Sep. 30, 2009—2 pages.

Written Opinion PCT/US2008/088228 dated Sep. 30, 2009—5 pages.

Davis, M. et al. "From Context to Content: Leveraging Context for Mobile Media Metadata." 9 pages.

Davis, M. et al. "Using Context and Similarity for Face and Location Identification."10 pages.

Flickr. "Welcome to Flickr—Photo Sharing," located at <http://www.flickr.com > visited on Feb. 26, 2007, one page.

Goldberger, J. et al. The Hungarian Clustering Method, located at <http://scholar.googles.com/scholar?num=20&h1=en&lr=&9=cache:vbwslsm1CisJ:www.openu.acil/Personal_sites/tarnirtassa/Publications/hcm.pdf+goldberger+clustering+method+hungarian> visited on Mar. 1, 2007, twelve pages.

0' Hare, N. et al. "Combination of Content Analysis and Context Features for Digital Photograph Retrieval." 7 pages.

Anonymous. (Date Unknown). "Google Earth User Guide—Using Image Overlays and 3D Models," located at <http://earth.google.com/userguide/v4/ug_imageoverlays.html >, nine pages.

U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.

Allen James F., "Maintaining Knowledge About Temporal Intervals", Communications of the ACM, Nov. 1983, vol. 26, No. 11 pp. 832-843; 12 pages.

Press Release, "QUALCOMM Conducts First Live Demonstration of FL Technology on a Wireless Handset", Qualcomm Inc., San Diego, Sep. 27, 2005; 3 pages.

MediaFlo, FLO Technology Overview, Qualcomm Inc. Copyright 2007; 24 pages.

Axup, Jeff et al., "Conceptualizing New Mobile Devices by Observing Gossip and Social Network Formation Amongst the Extremely Mobile", ITEE Technical Report #459, Dec. 19, 2005, pp. 1-71.

Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).

Davis, Marc et al., "From Context to Content: Leveraging Context to Infer Media Metadata", ACM Press, Oct. 10, 2004, pp. 1-8.

Kaasinen, E., "Behaviour & Information Technology", Taylor & Francis, vol. 24, No. 1, Jan./Feb. 2005, pp. 37-49, (Abstract only attached).

Konomi, Shin'ichi et al., "Supporting Colocated Interactions Using RFID and Social Network Displays", Pervasive Computing, Jul.-Sep. 2006 , vol. 5, No. 3, pp. 48-56 (pp. 1-4 of attached).

Lin, F. et al., "A unified framework for managing Web-based services.", Information Systems and e-Business Management, vol. 3, Oct. 2005, p. 299, (pp. 1-15 of attached).

Metz, Cade, "MySpace Nation", PC Magazine, Jun. 21, 2006, pp. 1-10 attached.

Perkowitz, Mike et al., "Utilizing Online Communities to Facilitate Physical World Interactions", The International Conference on Communities and Technologies, Sep. 19, 2003, Amsterdam, pp. 1 6.

Roush, Wade, "Social Machines", Continuous Computing Blog, Jul. 5, 2005, pp. 1-21.

Roush, Wade, "Social Machines", Technology Review, Aug. 2005, pp. 45-51.

Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).

Voight, Joan et al., "Lessons for Today's Digital Market", ADWEEKCOM, Oct. 2, 2006, pp. 1-6.

"Companies add new communication features to photo sharing.", Digital Imaging Digest, Feb. 2006, pp. 1-2.

"DAVE.TV and Eye Music Network Empower Users to Create Their Own Music TV Channel on Their Sites With New IPTV Channel", www.davenw.com/2006, Sep. 13, 2006, pp. 1-2.

"Digital rights management: a primer: developing a user-friendly means of protecting content.(Profile)", Screen Digest, No. 420, p. 305, Sep. 2006, (pp. 1-9 of attached).

"Emerging Markets: What media 2.0 can offer advertisers.", Campaign, Oct. 27, 2006, p. 26, (pp. 1-5 of attached).

"Reality Digital Debuts Opus", www.lightreading.com. Sep. 25, 2006, pp. 1.

"Reality Digital—Making Media Move", www.realitydigital.com, Nov. 28, 2006, pp. 1-2.

Notification of Transmittal of The International Search Report and The Written Opinion of The International Search Authority, or Declaration (PCT/US2007/'084797) dated Mar. 21, 2008; 11 pages.

International Search Report (PCT/US2007/084807) dated May 27, 2008; 3 pages.

International Preliminary Report on Patentability (PCT/US2007/084807) dated May 26, 2009; 5 pages.

International Search Report (PCT/US2010/026063) dated May 27, 2008; 3 pages.

Rekimoto, et al., "CyberCode: designing augmented reality environments with visual tags."Proceedings of DARE 2000 on Designing augmented reality environments, Elsinore, Denmark, pp. 1-11 Apr. 12-14, 2000.

"Semacode-URL Barcodes-practical ubiquitous computing", located at http://semacode.org visited on Apr. 13, 2007; 3 pages.

"Technical White Paper: Choosing the best 2D barcode format for mobile apps, "Semacode, Jul. 15, 2006; pp. 1-7 located at http://semacode.org/about/technical/whitepaper/best2_d_code.pdf.

Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.

Cooper, M. et al. (Nov. 2-8, 2003). "Temporal Event Clustering for Digital Photo Collections," MM'03 Berkeley, California, pp. 364-373.

Davis, M. et al. (Oct. 10-16, 2004). "From Context to Content: Leveraging Context to Infer Media Metadata," MM'04 New York, New York. 9 pages.

Davis, M. et al. "From Context to Content: Leveraging Context for Mobile Media Metadata." 9 pages, 2005.

Davis. M. et al. (Apr. 2-7, 2005). "MMM2: Mobile Media Metadata for Media Sharing," CHI 2005 Portland, Oregon. 4 pages.

Davis, M. et al. "Mobile Media Metadata for Mobile Imaging." Jun. 27-30, 2004; 4 pages.

Davis, M. et al. "Using Context and Similarity for Face and Location Identification."10 pages, 2006.

Flickr. Welcome to Flickr—Photo Sharing, located at <http://www.flickr.com> visited on Feb. 26, 2007, one page.

Gargi, U. (Aug. 7, 2003). "Consumer Media Capture: Time-Based Analysis and Event Clustering," Technical Report HPL-2003-165 HP Laboratories Palo Alto, pp. 1-15.

Goldberger, J. et al. The Hungarian Clustering Method, located at <http://scholar.googles.com/scholar?num=20&h1=en&lr=&9= cache:vbwslsm1CisJ:www.openu .acil/Personal_sites/tarnirtassa/Publications/hcm.pdf+goldberger+clustering+method+hungarian> visited on Mar. 1, 2007, twelve pages.

Graham, A. et al. (Jul. 13-17, 2002). Time as Essence for Photo Browsing Through Personal Digital Libraries, JCDL '02 Portland, Oregon. 11 pages.

Jaffe, A. et al. (May 23-26, 2006). "Generating Summaries for Large Collections of Geo-Referenced Photographs," WWW 2006 Edinburgh, Scotland. 2 pages.

Jaffe, A. et al. (Oct. 26-27, 2006). "Generating Summaries and Visualization for Large Collections of Geo-Referenced Photographs," MIR '06 Santa Barbara, California. 11 pages.

Joshi, D. et al. (Oct. 15-16, 2004). "The Story Picturing Engine: Finding Elite Images to Illustrate a Story Using Miitual Reinforcement," MIR '04 New York, New York. 9 pages.

Naaman, M. et al. (Nov. 2003). "From Where to What: Metadata Sharing for Digital Photographs with Geographic Coordinates," In on the Move to Meaningful Internet Systems 2003: Coop/S, DOA, and ODBASE R. Meersman et al. eds., pp. 196-217.

Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.

Nair, R. et al. (Nov. 6-11, 2005). "Photo L01: Browsing Multi-User Photo Collections," MM'05 Singapore, pp. 223-224.

0' Hare, N. et al. "Combination of Content Analysis and Context Features for Digital Photograph Retrieval." 7 pages, 2005.

Pigeau, A. et al. (Jun. 17, 2005). "Organizing a Personal Image Collection with Statistical Model-Based ICL Clustering on Spatio-Temporal Camera Phone Meta-Data." 25 pages.

Sarves, R. et al. (Jun. 6-9, 2004). "Metadata Creation System for Mobile Images," MobiSys'04 Boiton, Massachusetts, pp. 36-48.

Toyama, K. et al. (Nov. 2-8, 2003). "Geographic Location Tags on Digital Images," MM '03'Berkeley: California. 12 pages.

U.S. Appl. No. 11/593,668, filed Nov. 6, 2006 for Naaman, et al.

U.S. Appl. No. 11/593,869, filed Nov. 6, 2006 for Naaman, et al.

"Gutenkarte" Book Catalog, 2006 MetaCarta, Inc., www.gutenkarte.org 11pgs.

Baron, N.S. et al. (Aug. 30, 2005). "Tethered or Mobile? Use of Away Messages in Instant Messaging by American College Students," Chapter 20.1 in Mobile Communication, Springer: London, England, 31:293-297.

Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/>, last visited on Feb. 2, 2010, thirteen pages.

Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h>..., last visited on Feb. 2, 2010, ten pages.

Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p...,> last visited on Feb. 2, 2010, seventeen pages.

Wooldridge, M. et al. (2005). "STALK. The Camera-phone Scavenger Hunt!" located at <http://www.stalk.com>, last visited on Dec. 28, 2009, two pages.

www.stalk.com (retrieved on Dec. 29, 2009) pp. 1-2.

Anonymous. (Date Unknown). "CommunityWalk—About," located at <http://www.communitywalk.com/about>, last visited on Mar. 3, 2008, one page.

Anonymous. (Date Unknown). "CommunityWalk Mapping Made Easy," located at <http://www.communitywalk.com/>, last visited on Mar. 3, 2008, one page.

Anonymous. (Date Unknown). "Google Earth User Guide" located at <http://earth.google.com/userguide/v4/>, last visited on Feb. 27, 2008, twelve pages.

Anonymous. (Date Unknown). "Google Earth—Wikipedia, The Free Encyclopedia," located at <http://en.wikipedia.org/wiki/Google_earth>, last visited on Mar. 3, 2008, fourteen pages.

Anonymous. (Date Unknown). "Google Earth User Guide—Using Image Overlays and 3D Models," located at <http://earth.google.com/userguide/v4/ug_imageoverlays.html>, nine pages, 2007.

Anonymous. (Date Unknown). "Google Maps," located at <http://en.wikipedia.org/wiki/Google_maps>, last visited on Feb. 27, 2008, eleven pages.

Anonymous. (Date Unknown). "Live Search Maps," located at <http://en.wikipedia.org/wiki/Windows_live_maps>, last visited on Mar. 3, 2008, six pages.

Anonymous. (Date Unknown). "WikiMapia," located at <http://en.wikipedia.org/wiki/WikiMapia>, last visited on Mar. 3, 2008, three pages.

Anonymous. (2007). "Ask.com Maps & Directions," located at <http://maps.ask.com/maps>, last visited on Mar. 3, 2008, one page.

Anonymous. (2007). "Wayfaring Follow You, Follow Me," located at <http://www.wayfaring.com/>, last visited on Mar. 3, 2008, three pages.

Anonymous. (2008). "Platial the People's Atlas," located at <www.platial.com>, last visited on Mar. 3, 2008, one page.

Anonymous. (2008). "Wikimpaia.org ," located at <http://wikimpaia.org/>, last visited on Mar. 3, 2008, one page.

Nedos, A; Singh K., Clarke S, Proximity Based Group Communications for Mobile Ad Hoc Networks, Proximity-Based Group Communication; Global Smart Spaces; D.14; Oct. 3, 2003; 31 pages.

Brunato, M; Battiti R. "Pilgrim: A Location Broker and Mobility-Aware Recommendation System"; Technical report DIT-02-0092, Universita di Trento, Oct. 2002; 8 pages.

Backstrom et al., Spatial Variation in Search Engine Queries, WWW•2008, Beijing, China (Apr. 21-25, 2008).

Gan et al., Analysis of Geographic Queries in a Search Engine Log, LocWeb 2008, Beijing, China (Apr. 22, 2008).

Jones et al., Geographic Intention and Modification in Web Search, International Journal of Geographical Information Science, vol. 22, No. 3, pp. 1-20 (Jul. 2008).

Sanderson et al., Analyzing Geographic Queries; Department of Information Studies; University of Sheffield, UK; 2 pages, 2004.

Go With the Flow, The Economist Technology Quarterly, vol. 382, Issue 8519, 4 pages, (Mar. 10, 2007).

International Search Report and Written Opinion (PCT/US2009/060476) dated May 4, 2010; 12 pages.

International Search Report and Written Opinion (PCT/US2009/060374) dated Apr. 30, 2010; 12 pages.

International Search Report (PCT/US2009/060379) dated Apr. 30, 2010; 3 pages.

International Search Report and Written Opinion (PCT/US2008/085135) dated May 25, 2009; 7 pages.

International Search Report (PCT/US2009/055503) dated Apr. 8, 2010; 3 pages.

Written Opinion (PCT/US2008/085915) dated Jun. 29, 2009; 4 pages.

Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.

* cited by examiner

SYSTEM AND METHOD FOR DISTRIBUTING MEDIA RELATED TO A LOCATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for distributing media on a to users on a network and, more particularly, to systems and methods for distributing media on a to users on a network related to locations the users have visited.

BACKGROUND OF THE INVENTION

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information can be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY OF THE INVENTION

In one embodiment, the invention is a method. The physical location of a media presentation device is received over a network. The physical location of a plurality of end users are identified, via the network, wherein each of plurality of users is associated with a user device capable of storing media files. At least one of the end users is identified who is located in such proximity to the media presentation device that the user can perceive media that presented on the media presentation device. At least one media file that is currently being presented on the media presentation device is identified and transmitted over the network to each of the identified end users.

In one embodiment, the invention is a system comprising: a location tracking module that receives, over a network, the physical location of a plurality of media presentation devices and the physical location of a plurality of end users, wherein each of plurality of users are associated with a user device capable of storing media files; an eligible user identification module that identifies end users who are located in such proximity to a media presentation devices that the at the end users can perceive media that is presented on the media presentation devices; a location related media identification module that identifies at least one media file that is currently being presented on media presentation devices; and a media delivery module that transmits, over the network, identified media file to the user devices of the end users.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
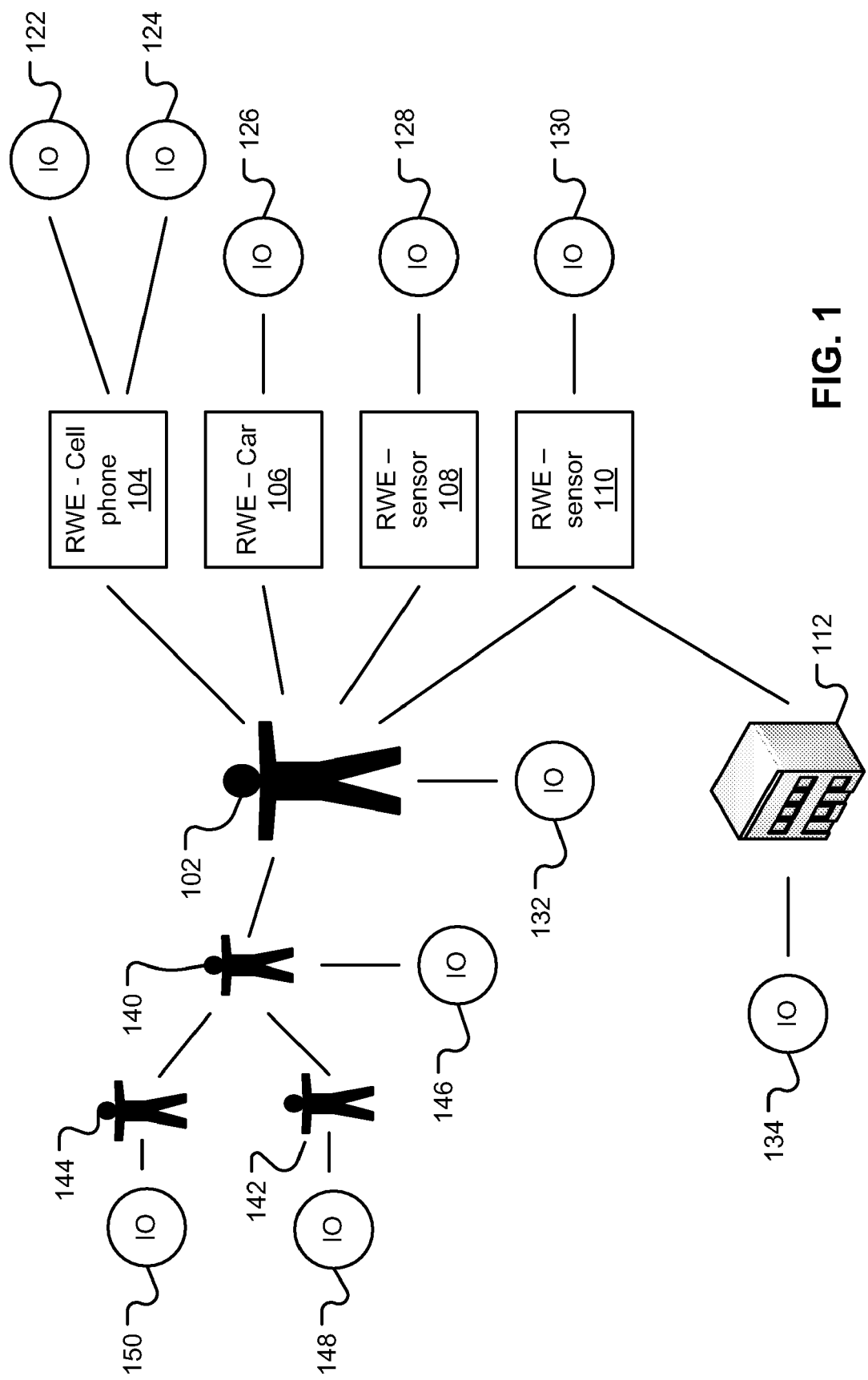
FIG. 1 illustrates relationships between real-world entities (RWE) and information objects (IO) on one embodiment of a W4 Communications Network (W4 COMN.)

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure the term "media" and "media content" should be understood to refer to binary data which contains content which can be of interest to an end user. By way of example, and not limitation, the term "media" and "media content" can refer to multimedia data, such as video data or audio data, or any other form of data capable of being transformed into a form perceivable by an end user. Such data can, furthermore, be encoded in any manner currently known, or which can be developed in the future, for specific purposes. By way of example, and not limitation, the data can be encrypted, compressed, and/or can contained embedded metadata.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

For the purposes of this disclosure an engine is a software, hardware, or firmware (or combinations thereof) system, process or functionality that performs or facilitates the processes, features, and/or functions described herein (with or without human interaction or augmentation).

Embodiments of the present invention utilize information provided by a network which is capable of providing data collected and stored by multiple devices on a network. Such information may include, without limitation, temporal information, spatial information, and user information relating to a specific user or hardware device. User information may include, without limitation, user demographics, user preferences, user social networks, and user behavior. One embodiment of such a network is a W4 Communications Network.

A "W4 Communications Network" or W4 COMN, provides information related to the "Who, What, When and Where" of interactions within the network. In one embodiment, the W4 COMN is a collection of users, devices and processes that foster both synchronous and asynchronous communications between users and their proxies providing an instrumented network of sensors providing data recognition and collection in real-world environments about any subject, location, user or combination thereof.

In one embodiment, the W4 COMN can handle the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

In one embodiment, the W4 COMN uses a data modeling strategy for creating profiles for not only users and locations, but also any device on the network and any kind of user-defined data with user-specified conditions. Using Social, Spatial, Temporal and Logical data available about a specific user, topic or logical data object, every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

In one embodiment, a W4 COMN network relates to what may be termed "real-world entities", hereinafter referred to as RWEs. A RWE refers to, without limitation, a person, device, location, or other physical thing known to a W4 COMN. In one embodiment, each RWE known to a W4 COMN is assigned a unique W4 identification number that identifies the RWE within the W4 COMN.

RWEs can interact with the network directly or through proxies, which can themselves be RWEs. Examples of RWEs that interact directly with the W4 COMN include any device such as a sensor, motor, or other piece of hardware connected to the W4 COMN in order to receive or transmit data or control signals. RWE may include all devices that can serve as network nodes or generate, request and/or consume data in a networked environment or that can be controlled through a network. Such devices include any kind of "dumb" device purpose-designed to interact with a network (e.g., cell phones, cable television set top boxes, fax machines, telephones, and radio frequency identification (RFID) tags, sensors, etc.).

Examples of RWEs that may use proxies to interact with W4 COMN network include non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) may be considered RWE that use proxies to interact with the network, where software applications executing on the device that serve as the devices' proxies.

In one embodiment, a W4 COMN may allow associations between RWEs IO be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMN.

An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is my home appliance, this person is my friend/father/son/etc., this device is shared between me and other users, etc.). RWEs can also be implicitly associated with a user based on a current situation. For example, a weather sensor on the W4 COMN can be implicitly associated with a user based on information indicating that the user lives or is passing near the sensor's location.

In one embodiment, a W4 COMN network may additionally include what may be termed "information-objects", hereinafter referred to as IOs. An information object (IO) is a logical object that may store, maintain, generate or otherwise provides data for use by RWEs and/or the W4 COMN. In one embodiment, data within in an IO can be revised by the act of an RWE An IO within in a W4 COMN can be provided a unique W4 identification number that identifies the IO within the W4 COMN.

In one embodiment, IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/ significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In one embodiment, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

In one embodiment, for every IO there are at least three classes of associated RWEs. The first is the RWE that owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs that access the IO in order to obtain data from the IO for some purpose.

Within the context of a W4 COMN, "available data" and "W4 data" means data that exists in an IO or data that can be collected from a known IO or RWE such as a deployed sensor. Within the context of a W4 COMN, "sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates one embodiment of relationships between RWEs and IOs on a W4 COMN. A user 102 is a RWE provided with a unique network ID. The user 102 may be a human that communicates with the network using proxy devices 104, 106, 108, 110 associated with the user 102, all of which are RWEs having a unique network ID. These proxies can communicate directly with the W4 COMN or can communicate with the W4 COMN using IOs such as applications executed on or by a proxy device.

In one embodiment, the proxy devices 104, 106, 108, 110 can be explicitly associated with the user 102. For example, one device 104 can be a smart phone connected by a cellular service provider to the network and another device 106 can be a smart vehicle that is connected to the network. Other devices can be implicitly associated with the user 102.

For example, one device 108 can be a "dumb" weather sensor at a location matching the current location of the user's cell phone 104, and thus implicitly associated with the user 102 while the two RWEs 104, 108 are co-located. Another implicitly associated device 110 can be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 can be directly associated with one or more persons 140, and indirectly associated with still more persons 142, 144 through a chain of direct associations. Such associations can be explicit (e.g., the user 102 can have identified the associated person 140 as his/her father, or can have identified the person 140 as a member of the user's social network) or implicit (e.g., they share the same address). Tracking the associations between people (and other RWEs as well) allows the creation of the concept of "intimacy", where intimacy may be defined as a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

In one embodiment, each RWE 102, 104, 106, 108, 110, 112, 140, 142, 144 of a W4 COMN can be associated with one or more IOs as shown. FIG. 1 illustrates two IOs 122, 124 as associated with the cell phone device 104. One IO 122 can be a passive data object such as an event record that is used by scheduling/calendaring software on the cell phone, a contact 10 used by an address book application, a historical record of a transaction made using the device 104 or a copy of a message sent from the device 104. The other IO 124 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. IOs may additionally relate to topics of interest to one or more RWEs, such topics including, without limitation, musical artists, genre of music, a location and so forth.

The IOs 122, 124 can be locally stored on the device 104 or stored remotely on some node or datastore accessible to the W4 COMN, such as a message server or cell phone service datacenter. The IO 126 associated with the vehicle 108 can be an electronic file containing the specifications and/or current status of the vehicle 108, such as make, model, identification number, current location, current speed, current condition, current owner, etc. The IO 128 associated with sensor 108 can identify the current state of the subject(s) monitored by the sensor 108, such as current weather or current traffic. The IO 130 associated with the cell phone 110 can be information in a database identifying recent calls or the amount of charges on the current bill. RWEs which can only interact with the W4 COMN through proxies, such as people 102, 140, 142, 144, computing devices 104, 106 and locations 112, can have one or more IOs 132, 134, 146, 148, 150 directly associated with them which contain RWE-specific information for the associated RWE. For example, IOs associated with a person 132, 146, 148, 150 can include a user profile containing email addresses, telephone numbers, physical addresses, user preferences, identification of devices and other RWEs associated with the user. The IOs may additionally include records of the user's past interactions with other RWEs on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.). Another example of IOs associated with a person 132, 146, 148, 150 includes remote applications through which a person can communicate with the W4 COMN such as an account with a web-based email service such as Yahoo! Mail. A location's IO 134 can contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In one embodiment, RWEs and IOs are correlated to identify relationships between them. RWEs and IOs may be correlated using metadata. For example, if an IO is a music file, metadata for the file can include data identifying the artist, song, etc., album art, and the format of the music data. This metadata can be stored as part of the music file or in one or more different IOs that are associated with the music file or both. W4 metadata can additionally include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
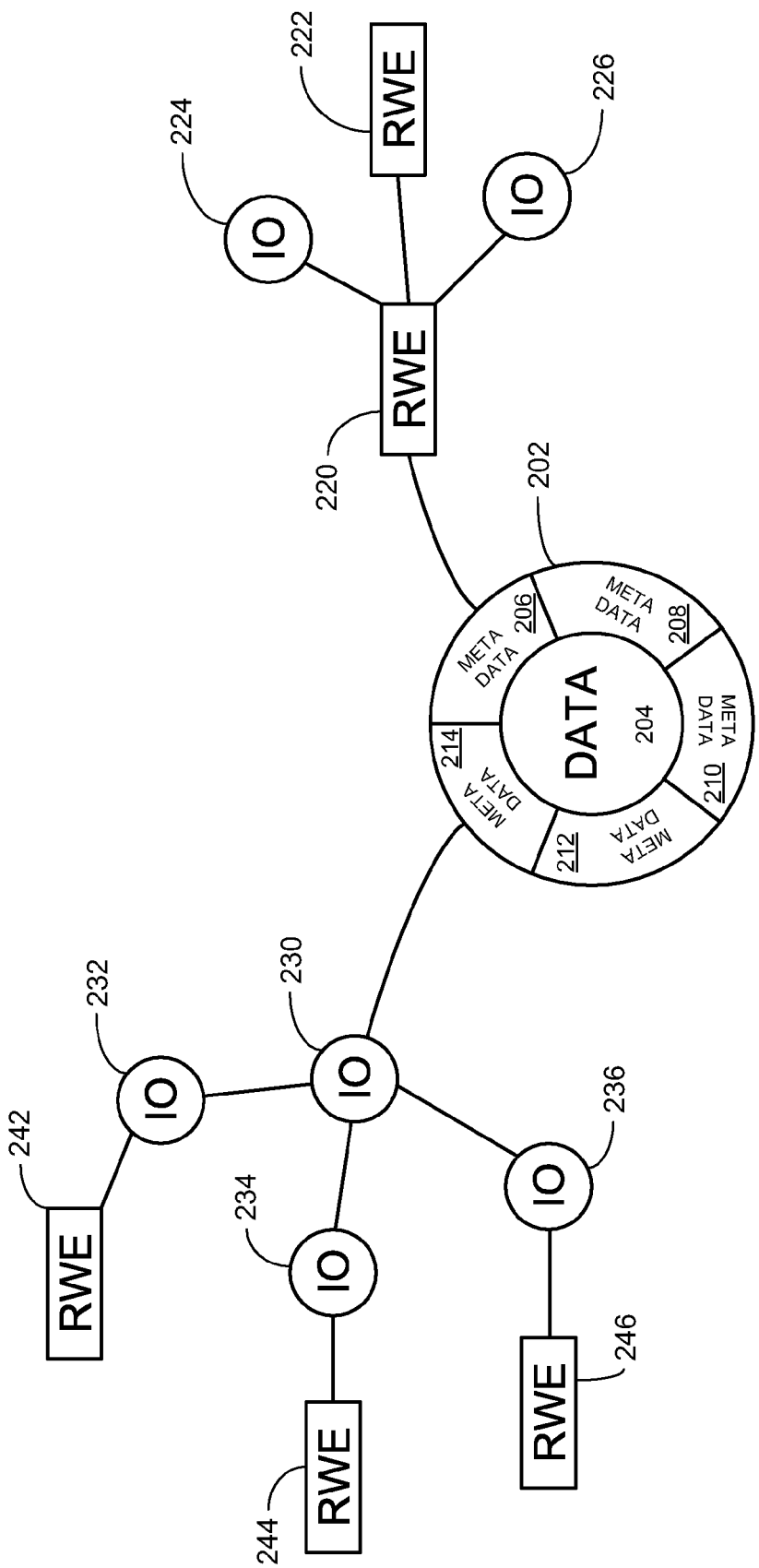
FIG. 2 illustrates metadata defining the relationships between RWEs and IOs on one embodiment of a W4 COMN.

FIG. 2 illustrates one embodiment of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 can contain information related only to the object data 204 and unrelated to any other IO or RWE. For example, a creation date, text or an image that is to be associated with the object data 204 of the IO 202. Some of items of metadata 206, 214, on the other hand, can identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. For example, could describe the relations between an image (IO 202) containing metadata 206 that identifies the electronic camera (the first RWE 220) and the user (the second RWE 224) that is known by the system to be the owner of the camera 220. Such ownership information can be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
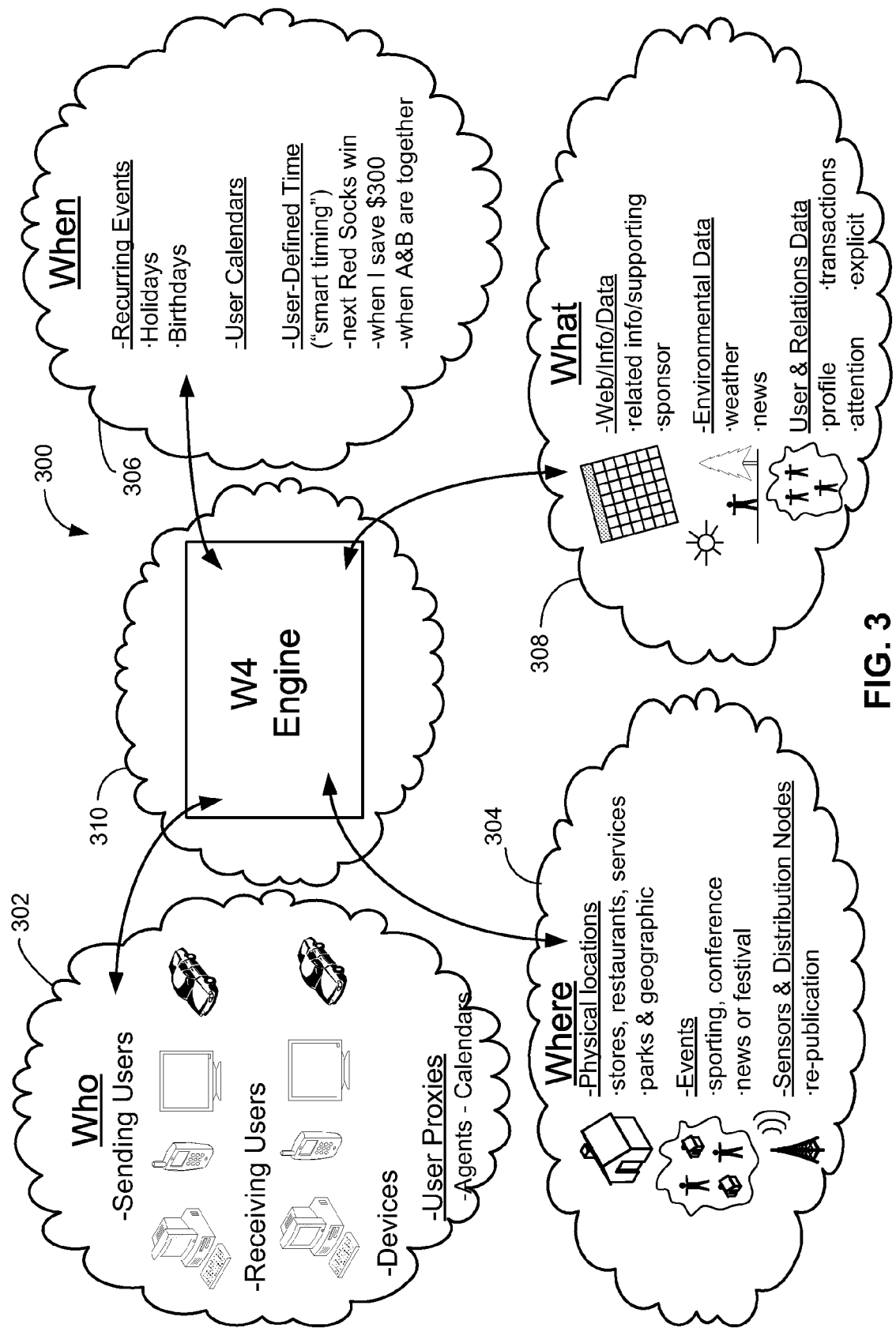
FIG. 3 illustrates a conceptual model of one embodiment of a W4 COMN.

FIG. 3 illustrates one embodiment of a conceptual model of a W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc. In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs).

The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

Some entities, sensors or data may potentially exist in multiple clouds either disparate in time or simultaneously. Additionally, some IOs and RWEs can be composites in that they combine elements from one or more clouds. Such composites can be classified as appropriate to facilitate the determination of associations between RWEs and IOs. For example, an event consisting of a location and time could be equally classified within the When cloud 306, the What cloud 308 and/or the Where cloud 304.

In one embodiment, a W4 engine 310 is center of the W4 COMN's intelligence for making all decisions in the W4 COMN. The W4 engine 310 controls all interactions between each layer of the W4 COMN and is responsible for executing any approved user or application objective enabled by W4 COMN operations or interoperating applications. In an embodiment, the W4 COMN is an open platform with standardized, published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs may be referred to as entity extraction. Entity extraction can include both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only where only W4 metadata related to the object is visible, but internal data of the IO (i.e., the actual primary or object data contained within the object) are not, and thus metadata extraction is limited to the metadata. Alternatively, if internal data of the IO is visible, it can also be used in entity extraction, e.g. strings within an email are extracted and associated as RWEs to for use in determining the relationships between the sender, user, topic or other RWE or IO impacted by the object or process.

In the embodiment shown, the W4 engine 310 can be one or a group of distributed computing devices, such as a general-purpose personal computers (PCs) or purpose built server computers, connected to the W4 COMN by communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as, without limitation, smart phones, web-enabled appliances, PCs, laptop computers, and personal data assistants (PDAs). Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a computer-readable medium (not shown) that is connected to, or part of, any of the computing devices described herein including the W4 engine 310. For example, in one embodiment, the data backbone of the W4 COMN, discussed below, includes multiple mass storage devices that maintain the IOs, metadata and data necessary to determine relationships between RWEs and IOs as described herein.

Figure 4:
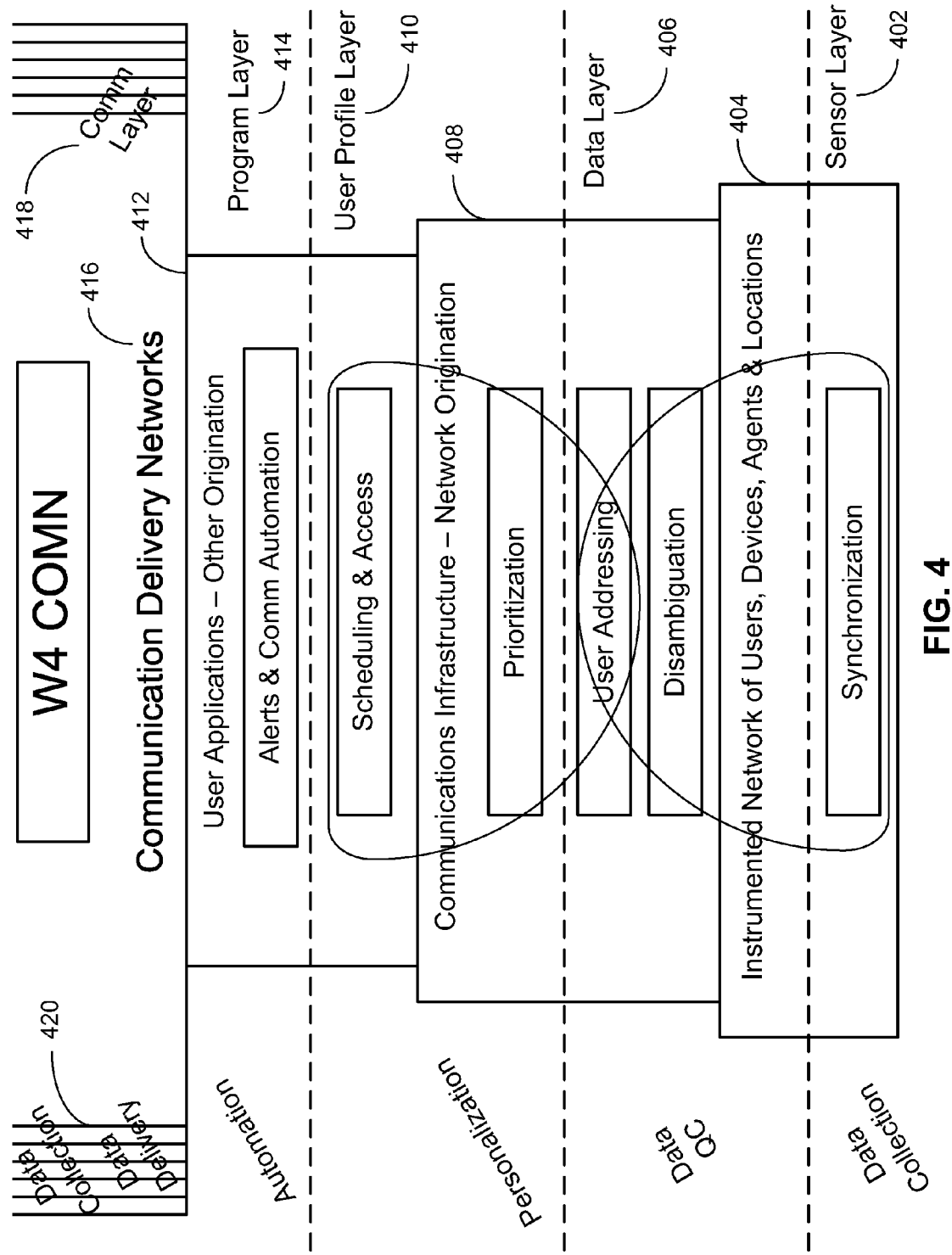
FIG. 4 illustrates the functional layers of one embodiment of the W4 COMN architecture.

FIG. 4 illustrates one embodiment of the functional layers of a W4 COMN architecture. At the lowest layer, referred to as the sensor layer 402, is the network 404 of the actual devices, users, nodes and other RWEs. Sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The data layer 406 stores and catalogs the data produced by the sensor layer 402. The data can be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The user profiling layer 410 performs the W4 COMN's user profiling functions. This layer 410 can further be distributed between the network infrastructure 408 and user applications/processes 412 executing on the W4 engine or disparate user computing devices. Personalization is enabled across any single or combination of communication channels and modes including email, IM, texting (SMS, etc.), photo-blogging, audio (e.g. telephone call), video (teleconferencing, live broadcast), games, data confidence processes, security, certification or any other W4 COMM process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available applications approved on the W4 COMN. Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from outside the network, e.g., RWEs such as users, locations, proxies and processes, come from the applications layer 414 of the W4 COMN. Some applications can be developed by the W4 COMN operator and appear to be implemented as part of the communications infrastructure 408, e.g. email or calendar programs because of how closely they operate with the sensor processing and user profiling layer 410. The applications 412 also serve as a sensor in that they, through their actions, generate data back to the data layer 406 via the data backbone concerning any data created or available due to the applications execution.

In one embodiment, the applications layer 414 can also provide a user interface (UT) based on device, network, carrier as well as user-selected or security-based customizations. Any UT can operate within the W4 COMN if it is instrumented to provide data on user interactions or actions back to the network. In the case of W4 COMN enabled mobile devices, the UT can also be used to confirm or disambiguate incomplete W4 data in real-time, as well as correlation, triangulation and synchronization sensors for other nearby enabled or non-enabled devices.

At some point, the network effects enough enabled devices allow the network to gather complete or nearly complete data (sufficient for profiling and tracking) of a non-enabled device because of its regular intersection and sensing by enabled devices in its real-world location.

Above the applications layer 414, or hosted within it, is the communications delivery network 416. The communications delivery network can be operated by the W4 COMN operator or be independent third-party carrier service. Data may be delivered via synchronous or asynchronous communication. In every case, the communication delivery network 414 will be sending or receiving data on behalf of a specific application or network infrastructure 408 request.

The communication delivery layer 418 also has elements that act as sensors including W4 entity extraction from phone calls, emails, blogs, etc. as well as specific user commands within the delivery network context. For example, "save and prioritize this call" said before end of call can trigger a recording of the previous conversation to be saved and for the W4 entities within the conversation to analyzed and increased in weighting prioritization decisions in the personalization/user profiling layer 410.

Figure 5:
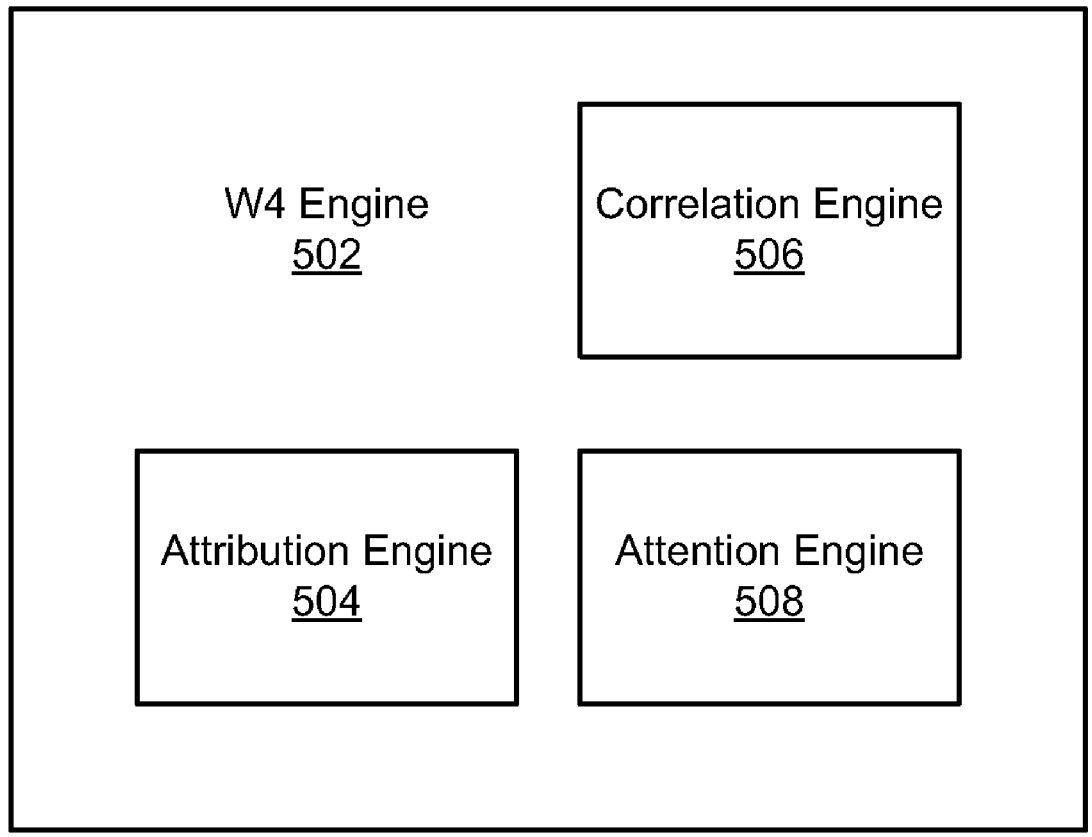
FIG. 5 illustrates the analysis components of one embodiment of a W4 engine as shown in FIG. 2.

FIG. 5 illustrates one embodiment of the analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information IO be determined for each IO known to the W4 COMN.

The correlation engine 506 can operates two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data, using, for example, one or more histograms A histogram is a mapping technique that counts the number of observations that fall into various disjoint categories (i.e. bins.). By selecting each IO, RWE, and other known parameters (e.g., times, dates, locations, etc.) as different bins and mapping the available data, relationships between RWEs, IOs and the other parameters can be identified. A histogram of all RWEs and IOs is created, from which correlations based on the graph can be made.

As a pre-processor, the correlation engine 506 monitors the information provided by RWEs in order to determine if any conditions are identified that can trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
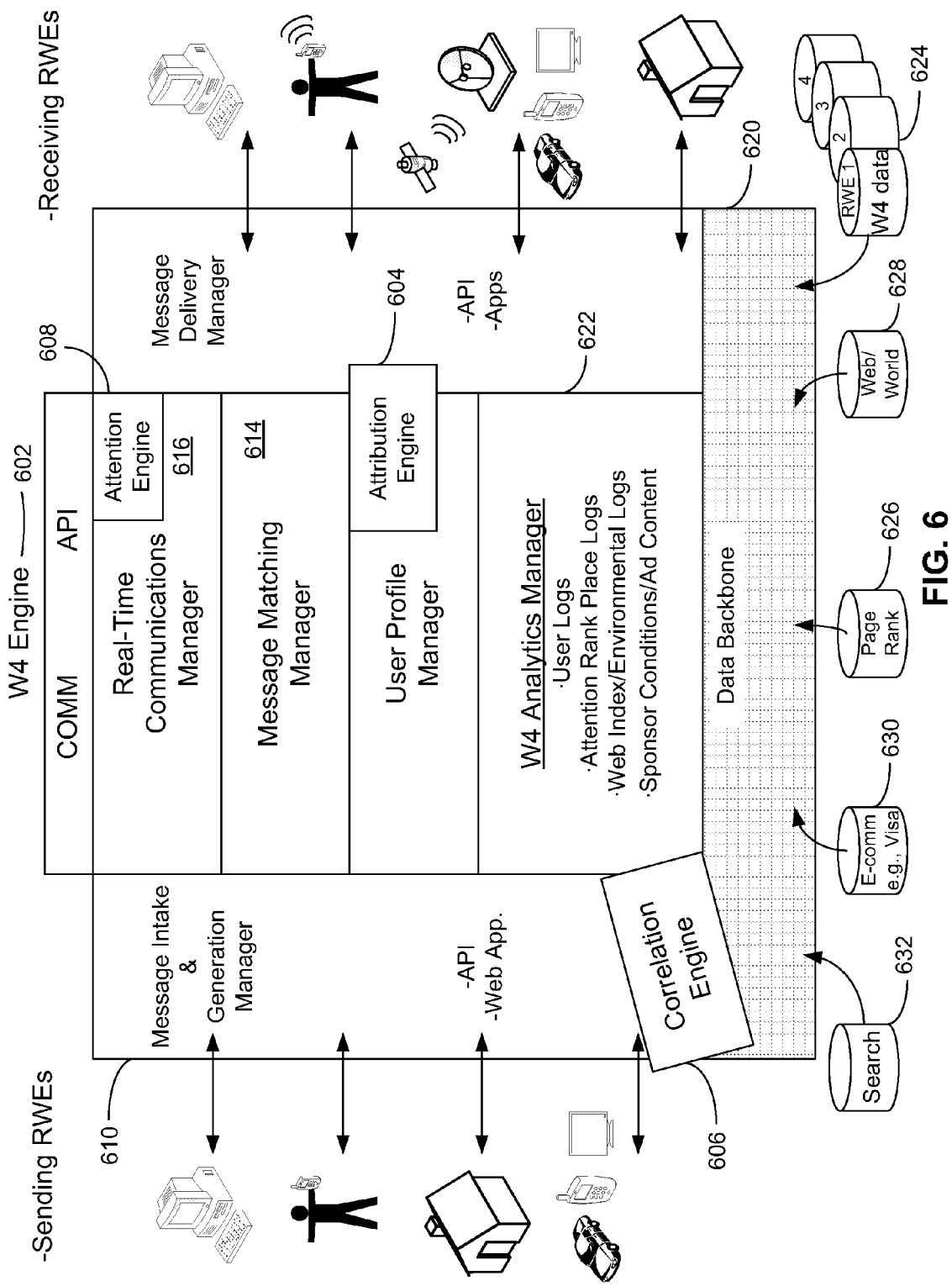
FIG. 6 illustrates one embodiment of a W4 engine showing different components within the sub-engines shown in FIG. 5.

FIG. 6 illustrates one embodiment of a W4 engine showing different components within the sub-engines described above with reference to FIG. 4. In one embodiment the W4 engine 602 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622. The data backbone 620 includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4COMN process, IO or event. Because of the amount of data that the W4 COMN will potentially store, the data backbone 620 includes numerous database servers and datastores in communication with the W4 COMN to provide sufficient storage capacity.

The data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

Logical and IO data refers to the data contained by an IO as well as data associated with the IO such as creation time, owner, associated RWEs, when the IO was last accessed, the topic or subject of the IO (from message content or "re" or subject line, as some examples) etc. For example, an IO may relate to media data. Media data can include any data relating to presentable media, such as audio data, visual data, and audiovisual data. Audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device.

Audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like.

The media data can include non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. Media data can be used, for example, to deduce activities information or preferences information, such as cultural and/or buying preferences information.

Relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs. For example, relationship data for a cell phone can indicate the user that owns the cell phone and the company that provides the service to the phone. As another example, relationship data for a smart car can identify the owner, a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

Interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
|---|---|---|
| Cell tower | Time stamps | Interpersonal |
| GPRS | Local clock | communications |
| GPS | Network clock | Media |
| WiFi | User input of time | Relationships |
| Personal area network | | Transactions |
| Network access points | | Device interactions |
| User input of location | | |
| Geo-coordinates | | |

Interaction data includes communication data between any RWEs that is transferred via the W4 COMN. For example, the communication data can be data associated with an incoming or outgoing short message service (SMS) message, email message, voice call (e.g., a cell phone call, a voice over IP call), or other type of interpersonal communication related to an RWE. Communication data can be correlated with, for example, temporal data to deduce information regarding frequency of communications, including concentrated communication patterns, which can indicate user activity information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
|---|---|
| Interpersonal communication data | Text-based communications, such as SMS and e-mail |
| | Audio-based communications, such as voice calls, voice notes, voice mail |
| | Media-based communications, such as multimedia messaging service (MMS) communications |
| | Unique identifiers associated with a communication, such as phone numbers, e-mail addresses, and network addresses |

TABLE 2-continued

Examples of Interaction Data

| Type of Data | Example(s) |
| --- | --- |
| Media data | Audio data, such as music data (artist, genre, track, album, etc.)<br>Visual data, such as any text, images and video data, including Internet data, picture data, podcast data and playlist data<br>Network interaction data, such as click patterns and channel viewing patterns |
| Relationship data | User identifying information, such as name, age, gender, race, and social security number<br>Social network data |
| Transactional data | Vendors<br>Financial accounts, such as credit cards and banks data<br>Type of merchandise/services purchased<br>Cost of purchases<br>Inventory of purchases |
| Device interaction data | Any data not captured above dealing with user interaction of the device, such as patterns of use of the device, applications utilized, and so forth |

Location Based Media Delivery

Music and media of other types are often used by businesses to draw, retain, and entertain customers. For example, restaurants and retailers, among others, use ambient music to make their customer's dining or shopping experience more enjoyable. At nightclubs and lounges, music, videos, and images may be part of the entertainment supplied by such establishments. Businesses select media for play that they believe will appeal most to their customer base. Such selection may be achieved by selecting an available radio station, an available Muzak channel, creating custom mix CDs, or even a live DJ.

Such selections are, however, only an approximation or prediction of media their customers might enjoy. Businesses may know the demographics of their customer base, but they do not know who, that is to say, what specific individuals with what specific media tastes, are in a business location at any time or over time. Moreover, even if a business has some idea of who is in a business location, the business may have little concept of what the individual preferences of each individual are. Ideally, a business may wish to vary the content of media played within a location, tailoring the media to the preferences of persons actually present at the location.

For example, a restaurant may wish to vary the ambient music played in the coffee house such that, when the customer group is predominantly older white collar workers, such as at breakfast and lunchtime, the background music is composed of favorite songs of such customers from the 1970's and 1980's. When, later at night, the crowd is under 30, the business may prefer to play background music composed of current music released by the favorite groups of the customers then onsite. Beyond tracking the taste's of the "average" customer, they can track the taste's and media inventory of actual customers in real-time and adjust the media being displayed on-site to suit the tastes of the totality, a majority or even just a VIP group or sub-group of customers depending on the context and user's involved.

Such concepts are useful at home as well. For example, if a person is having a party at his or her house, he or she may wish to generate a playlist aggregated from the favorite music of the guests. A family may wish to play a mix of music that reflects the tastes of the family members currently at home in an egalitarian or weighted fashion depending on dad's mood. In every case mentioned above, the presence of specific individuals at a location cause the mix of media played at the location to respond to the preferences and personality of those individuals actually present.

A business might also wish to influence the music played on individual's personal media players when such individuals are in, or near a business's location. For example, a business wish to allow potential customers who come within close proximity to one of the business's locations to experience the music played at the location on the user's personal media player, or within the location a specific channel or playlist is personalized for that user's device to receive, display and/or broadcast.

Such concepts may be further extended to the individual users. For example, when two friends are in close proximity to one another, they may wish to have personal theme songs played on each other's portable media player or mobile phone. In general, in such cases, the presence of an individual at or near a business location or another individual causes the mix of media played on the individual's personal media player to respond to the presence of the business or the other individual, and depending on user preference, can interrupt and replace playing media with the new media and/or download the media into a new file or playlist for later continued consumption by users.

The embodiments of the present invention discussed below illustrate application of the present invention within a W4 COMN. Nevertheless, it is understood that the invention can be implemented using any networked system in which is capable of tracking the physical location of users and media enabled electronic devices, and which is further capable of collecting and storing user profile data, as well as temporal, spatial, topical and social data relating to users, their proxies and their devices.

A W4 COMN can provide a platform that enables music played at a location to vary with the mix of individuals present at the location on a real-time or near time basis. A W4 COMN can also provide a platform that enables music played on an individual's portable media devices to respond to nearby business locations or other individuals. The W4 COMN is able to achieve such a result, in part, because the W4 COMN is aware of the physical location of persons and places, and is further aware of the media preferences of such persons and places and their relationship to one another. The W4 COMN also has access to aggregated users data profiles and behavior patterns over-time against which to map or compare new events in specific contexts to validate, modify or derive data values for consideration in the selection or presentation of media files to users.

Figure 7:
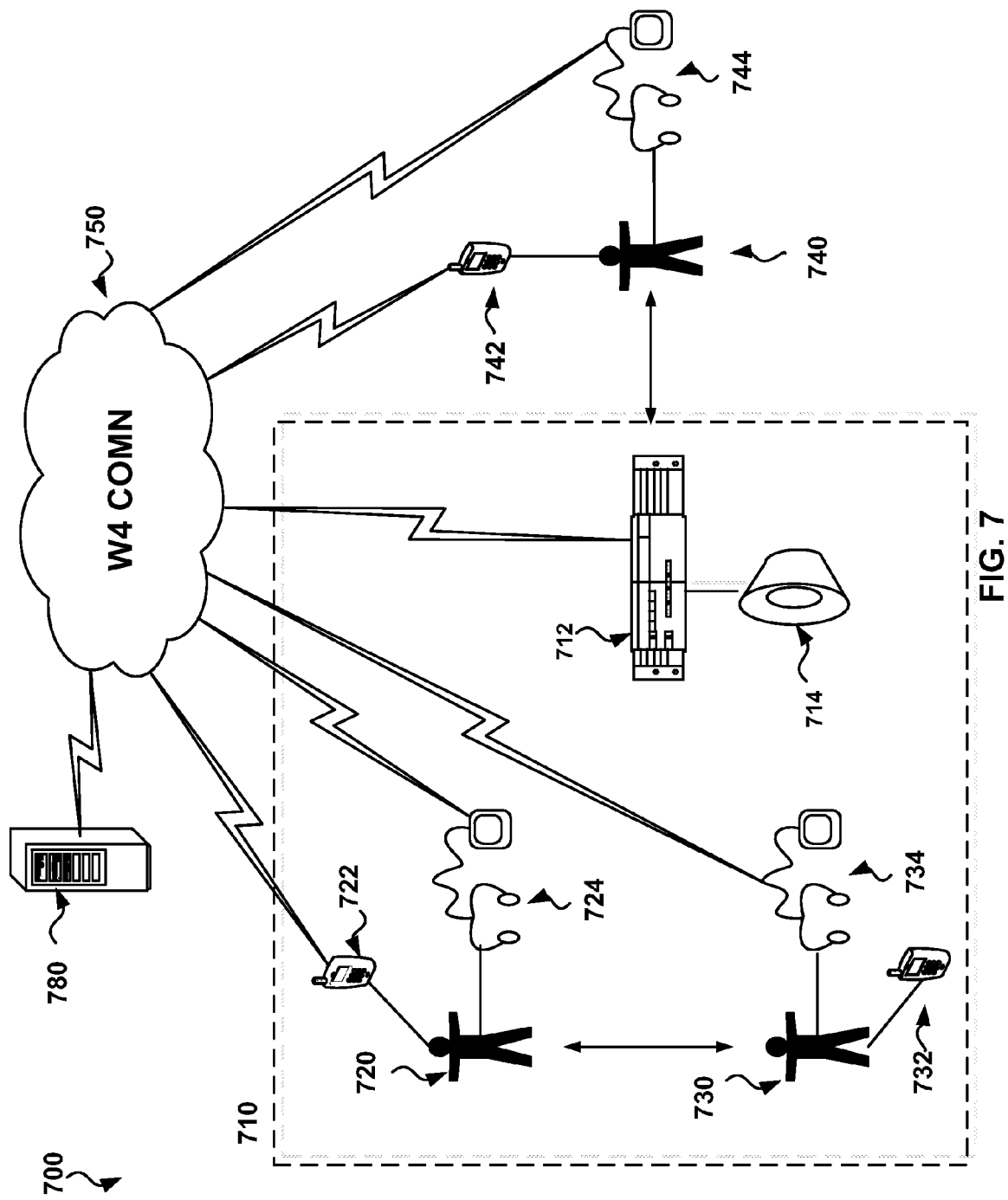
FIG. 7. illustrates one embodiment of the use of a W4 COMN for location based media delivery.

FIG. 7 illustrates one embodiment of the use of a W4 COMN for location based media delivery.

In the illustrated embodiment, a business or an individual 710 has a bounded physical location, such as, for example, a building, a room within a building, a house, an apartment, or an open-air location. The location 710 has an entertainment system 712 which includes a sound and video reproduction system 714 for playing ambient music and/or video. The entertainment presentation system could be additionally configured for the presentation of media including videos, images, as well as special effects such as smoke and light shows. The geographical position of the entertainment system 712 can be determined by GPS sensors within the device or by any other position determination technique, such as triangulation of cellular signals. Alternatively, the geographical position of the device may be known through a one-time measurement or position determination. The entertainment system may additionally contain sensors, such as temperature sensors, motion sensors, spatial orientation sensors or volume or noise level sensors.

Within the location 710 are two individuals 720 and 730. Each of the individuals has a programmable cell phone 722 and 732 and a portable media player 724 and 734. The geographical position of the cell phones 722 and 732 and the portable media players 724 and 734 can be determined by GPS sensors within the devices or by any other position determination technique, such as triangulation of cellular signals transmitted by the devices. Any of the devices may contain additional environmental sensors, such as temperature sensors, or biometric sensors, such as heart rate or blood pressure monitors. The individuals 720 and 730 are within sight of one another, and can communicate with one another, for example, using their cell phones, or can come within speaking distance of one another.

Outside the location 710, a third individual 740 is traveling past the location. The individual has a programmable cell phone 742 and a portable media player 744. The geographical position of the cell phones 742 and the portable media player 744 can be determined by GPS sensors within the devices or by any other position determination technique, such as triangulation of cellular signals. Any of the devices may contain additional environmental sensors, such as temperature, or biometric sensors, such as heart rate or blood pressure monitors. The individual 740 is within sight of the location 710, and can enter the location if he or she so chooses.

The entertainment system 712 and the user devices 722, 724, 732, 734, 742, and 744 are connected to a W4 COMN through network interfaces such as cellular connections or wireless Internet connections. The devices are defined to the W4 COMN and can be considered components of the W4 COMN. The devices send and receive information from the W4 COMN. In one embodiment, an attention engine within a W4 engine (not shown) tracks the location of devices 712, 724, 732, 734, 742, and 744. The devices 712, 724, 732, 734, 742, and 744 may be capable of sending geographic position information to the attention engine, or, alternatively, the attention engine may determine the position of the devices using, for example, triangulation of cellular signals. The W4 COMN can also monitor communications sent and received by user devices and track interaction data for all the devices.

One or more data services 780 which are external to the W4 COMN are attached to the network and provide additional data regarding entities and objects known to the W4 COMN. Examples of such data services are Internet Service Providers, telecom carriers, personal publishing sites such as blogs, Flickr or YouTube, social networking sites, such as Facebook and media content and metadata sites.

Figure 8:
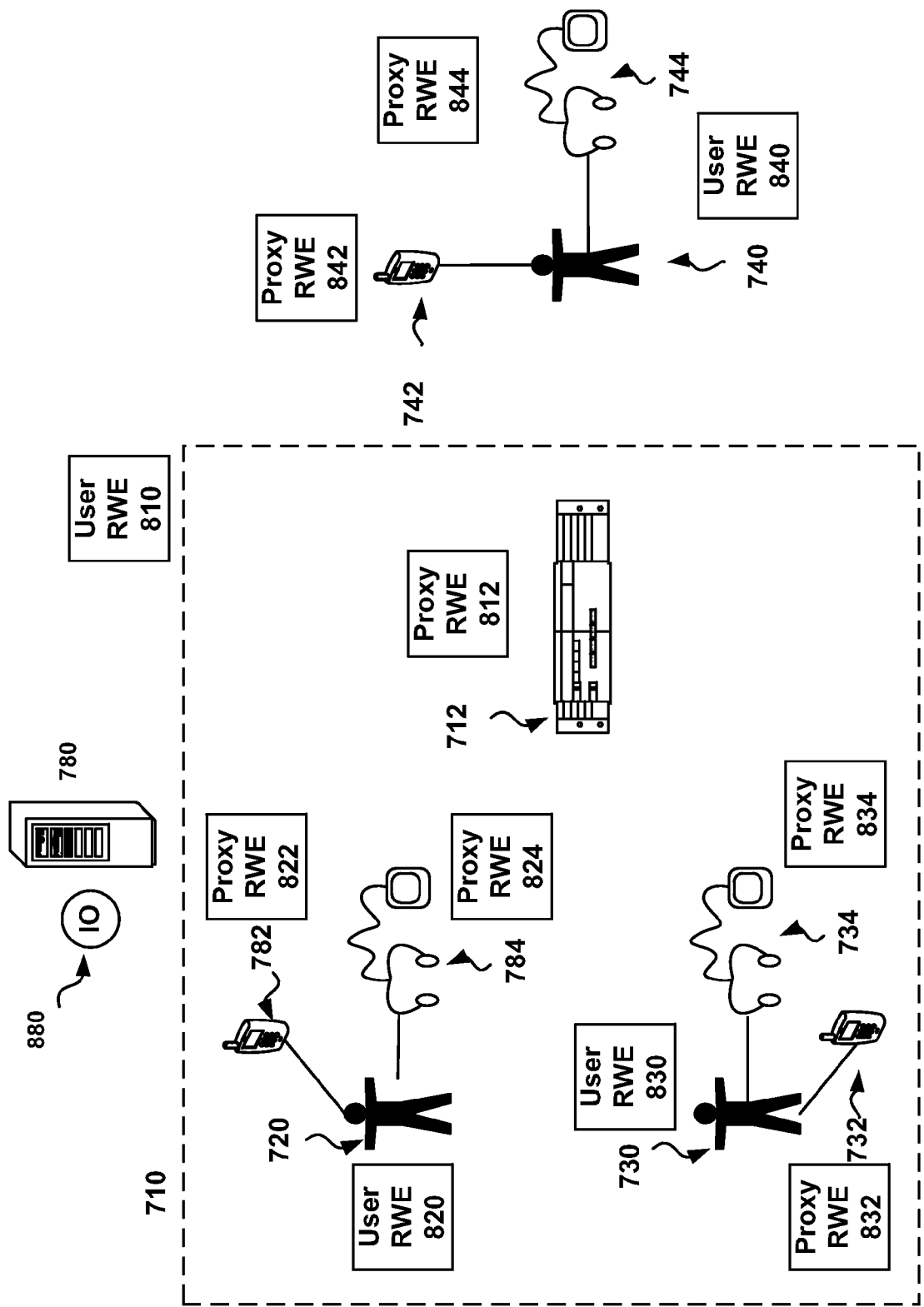
FIG. 8 illustrates one embodiment of how the users and devices shown in FIG. 7 can be defined to a W4 COMN.

FIG. 8 illustrates one embodiment of how the users and devices shown in FIG. 7 can be defined to a W4 COMN. Individuals 720, 730, and 740 are represented as user RWEs, 820, 830, and 840 respectively. Each individual's devices are represented as proxy RWEs 822, 824, 832, 834, 842, and 844. The location 710 is represented as a business RWE 810 and the entertainment system 712 is represented as a proxy RWE 812. The W4 COMN collects spatial data, temporal data, RWE interaction data, IO content data (e.g., media data), and user data including explicitly-provided and deduced social and relationship data for all of the RWEs shown in FIG. 8. External data providers 780 are, in one embodiment, defined to the W4 COMN as one or more active IOs 880.

Figure 9:
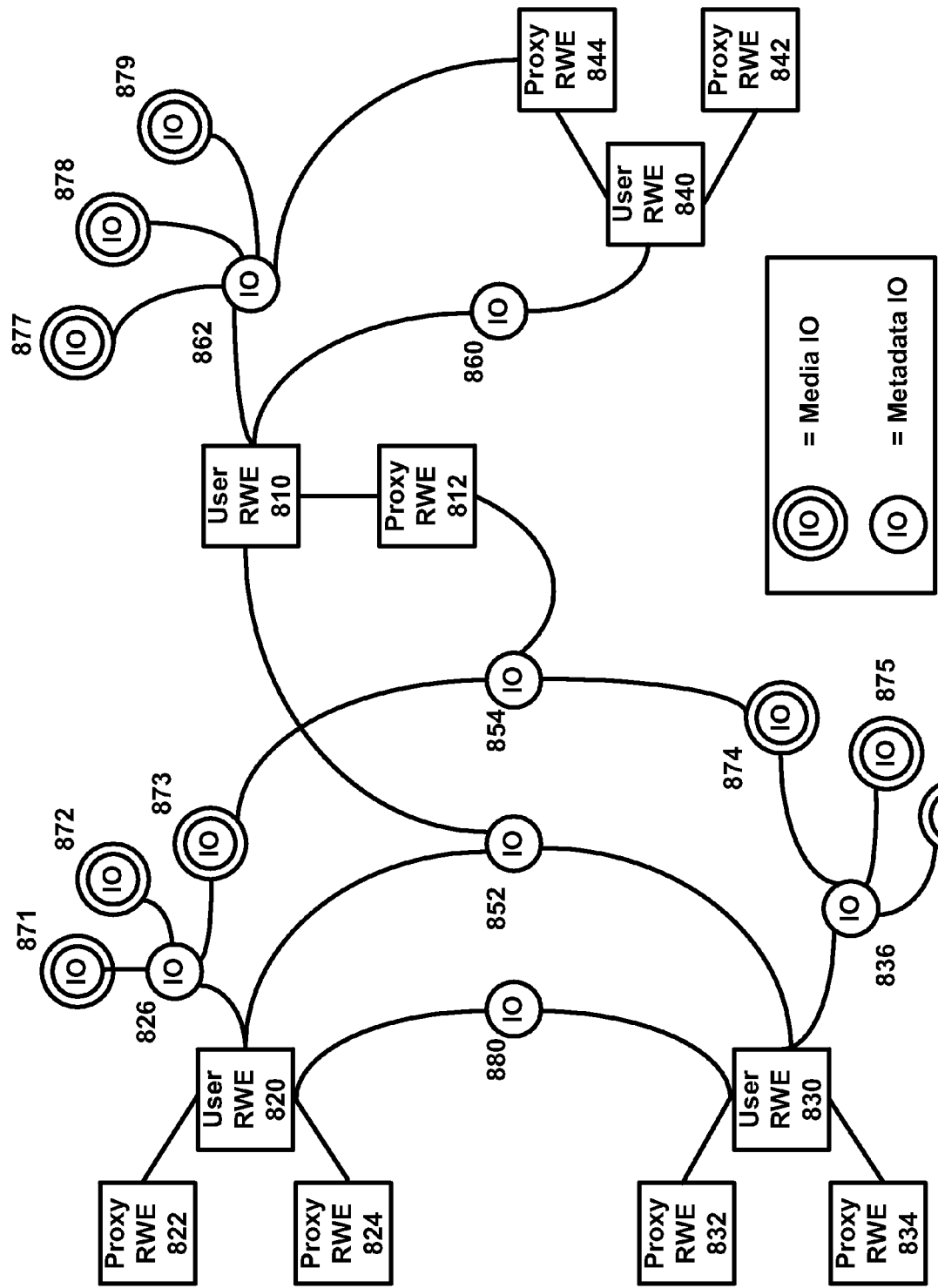
FIG. 9 illustrates one embodiment of a data model showing how the RWEs shown in FIG. 8 can be related to entities and objects within a W4 COMN.

FIG. 9 illustrates one embodiment of a data model showing how the RWEs shown in FIG. 8 can be related to entities and objects within a W4 COMN. Each user RWE for an individual 820, 830, 840 is associated with proxy RWEs representing user devices used by the individual. For example, user 820 is associated with proxy RWEs 822 and 824 corresponding to the user's cell phone and portable media device respectively. A user RWE can be associated with one or more user data IOs which can contain, without limitation, user demographic data, user interests, user media libraries and published content such as blogs, photos or videos, user's ecommerce sites, user social networks, user associations, transactions, surfing history, search history, communication events and communications content data. The business RWE 810 is associated with a proxy RWE 812 for the entertainment system.

In the illustrated embodiment, the two user RWE 820 and 830 are associated with one another, for example, through a social networking site and/or a texting and talking history to support daily interaction of sometimes frequent or lengthy duration. For example, the two users may be explicit friends within a social network, or the relationship can be derived from the data sensed about co-presence, shared third-party contacts combined with type, length and duration of interaction demonstrated in their combined data streams. Additionally, or alternatively, the user profiles associated with each user RWE 820 and 830 may list the other individual as a contact or friend. The user RWEs may also be related to each other through other IOs, for example, an IO relating to a topic (i.e. the individuals are interested in the same music.) In the illustrated embodiment, user RWEs 820 and 830 are also currently associated with an IO relating to a topic 852 corresponding to the fact that the individuals are both physically present in a location associated with business RWE 810.

Each user RWE 820 and 830 can be associated with IOs relating to topics that reflect the individual's musical interests. For example, if RWE 820 and 830, are each interested in a specific artist, such interest is reflected as an association with an IO relating to a topic 826 and 836 respectively. The IO relating to topics 826 and 836 are each associated with a group of media objects, 871, 872, 873, and 874, 875, 876 respectively. The media objects are songs, videos or other media relating to their corresponding IO relating to topics 826 and 836. Playlists, media objects, and other IO may also be associated with proxy RWEs. For example, a playlist may be stored on, and associated with, a media player used by an individual.

The business RWE 810 is associated with a proxy RWE 812 corresponding to the entertainment system within the location. The proxy RWE for the entertainment system is associated with a playlist IO 854 which has two selections from the group of media objects associated with the user RWEs 820 and 830. The playlist IO 854 represents the playlist that the entertainment system associated with the proxy RWE 812 is currently playing. In one embodiment, the playlist IO is tailored to contain selections of interest to both user RWEs 820 and 830.

The business RWE 810 is further associated with a second playlist IO 862 which references media objects 877, 878 and 879 which the business wishes to present to individuals outside the business as representative of music played within the location, or as a positive brand association campaign on behalf of the business RWE 810. The user RWE 840 is currently associated with an IO relating to a topic 860 corresponding to the fact that the user is outside of, but within a short distance from, the business's location. An RWE 844 corresponding to a proxy device, for example, a portable media player is associated with the user RWE 840 and the playlist IO 862. The proxy device associated with the proxy RWE 844 can use the playlist IO 862 to request delivery of media 877, 878, and 879 associated with the playlist.

In one embodiment, within a W4 COMN, the relationships shown in FIG. 9 are built and maintained by one or more correlation engines within a W4 engine which services the W4 COMN at regular intervals to refresh user and transaction databases from the constantly accruing data stream created by users, devices, proxies and in the real world. The creation of such relationships may be automatic and part of the normal operation of the W4 COMN. Alternatively, certain relationships, such as creation of dynamic playlists, for example, IO 854, may be created on demand.

Figure 10:
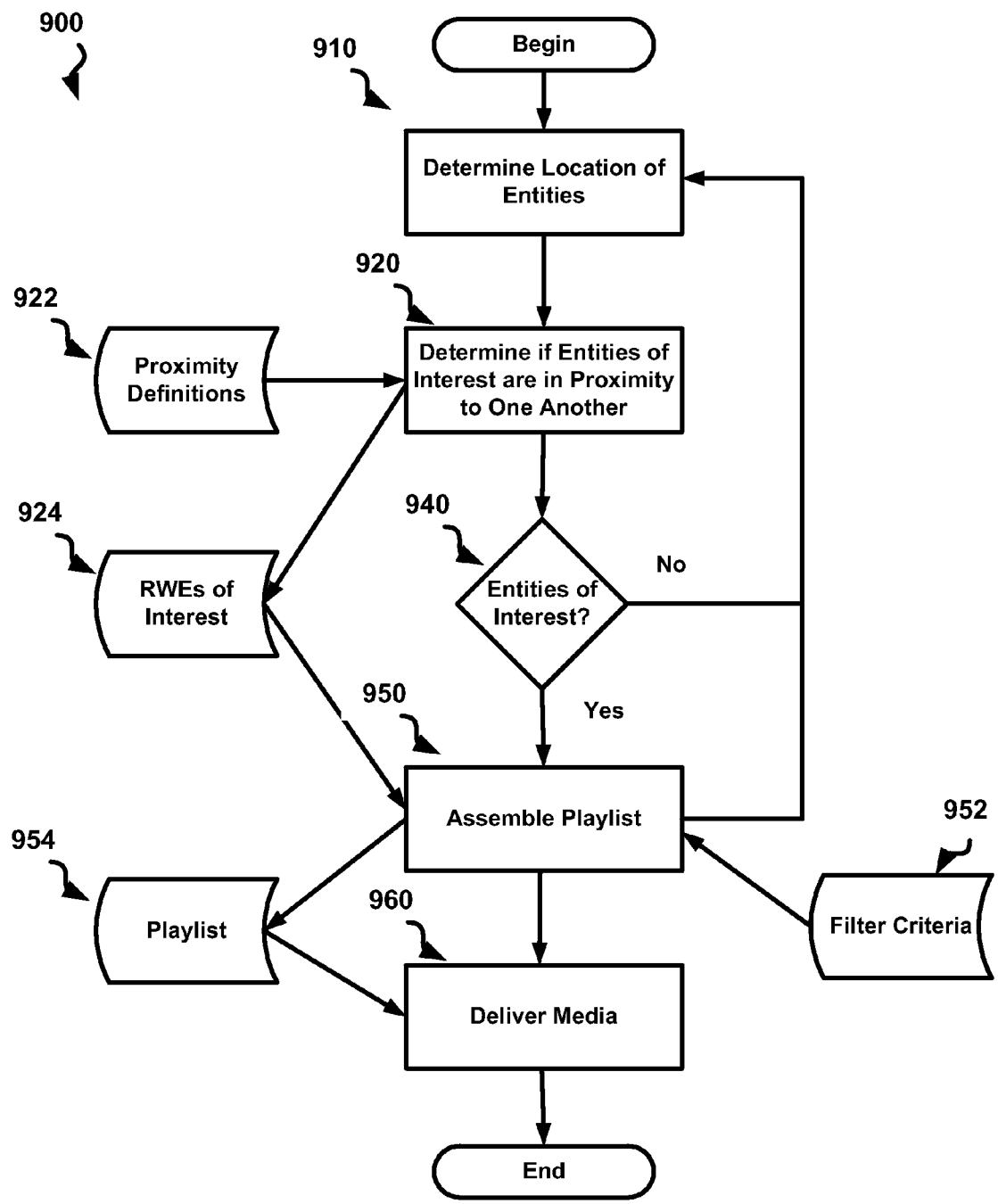
FIG. 10 illustrates one embodiment of a process which uses temporal, spatial, and social data to provide customized music for a location containing one or more individuals or businesses.

FIG. 10 illustrates one embodiment of a process 900 of how a W4 COMN can use temporal, spatial, and social data to provide customized music for a location containing one or more individuals or businesses known to a W4 COMN.

Spatial data (i.e. the geographic location of devices) is periodically determined 910 for entities such as users and businesses which, within a W4 COMN can be defined to the network as RWEs. The location of users and businesses are determined through devices, such as phones or media players, which, within a W4 COMN, may be associated with proxy RWEs. In one embodiment, a location tracking module tracks the location of devices. The location of devices may be periodically transmitted by the devices to the network, or alternatively, the location of devices may be periodically derived, for example, by triangulation of a cellular signal or association with another known device or user, or by sensing from other environmentally-present sensors including those present at the physical locations of business RWEs. If a user or proxy is associated with a fixed location, for example, a business, the location may be known and defined as a constant, for example, within metadata associated with a location RWE. Spatial data for such entities is thus constant and part of the background upon which mobile users and devices are plotted over time.

For every entity, it is then determined if there are any other entities of interest 920 to the entity within a defined physical and/or logical proximity to the entity. For example, it can be determined that individual users are within a physical location associated with a business, or outside of the location, but no more that 100 feet away. In another example, it can be determined that a user is within 100 feet of another user in real-space and is also in the same social network. In another example, it can be determined if a user is within 500 feet of another user with whom the user is carrying on a voice or text based conversation through user proxy devices. In one embodiment, proximity relationships are determined by a proximity correlation module within a correlation engine within a W4 engine.

In one embodiment, definitions that outline when an entity is of interest to another entity, herein referred to as proximity definitions 922, are stored within the W4 COMN. Proximity definitions 922 can be stored within a W4 COMN, for example, as IOs associated with an RWE. Any entity which falls within one or more proximity definitions of a specific entity are considered entities of interest to that specific entity. In one embodiment, lists of RWEs of interest 924 are stored within the W4 COMN as IO relating to a topics, such as, for example, 852 of FIG. 9, which is owned by an RWE 810 corresponding to a location, wherein user RWEs of interest (i.e. users within a location) are associated with an IO relating to a topic 852 associated with the location.

In general, proximity definitions 922 can contain criteria that relate to any type of temporal, spatial, social, or topical data. "Proximity" should be understood to refer to not only spatial proximity between two or more entities, but also can also include proximity between two entities in time, within social networks or social relations, within network or Internet activities or subscriptions, or interests. Thus proximity definition can contain criteria that are purely spatial, for example, all persons within a bounded physical space (e.g. a bar or brick and mortar retailer), but may also contain more subjective criteria (e.g. users who are interested in a specific genre of music, or who are in a specific social network or members of a club.) Proximity definitions can also be used to describe groups or groupings of users of interest, such as a restaurant seeking to push media and sponsored offers to groups of known users larger than five, whereas a jeweler would seek to push media to pairs of users whose profiles and/or associated data support a primary relationship pair.

Proximity definitions can be dynamic and conditional (i.e. programmatic) and can respond to changes in one or more context or environmental factors. For example, if a user moves from one location to another, the media files a user is associated with can vary based upon context; a user can be associated with one set of music at a bar, but another at the office. Proximity definitions can, furthermore, respond to conditions unrelated to users, e.g. an outside news event of the reporting of a singer's death might immediately preference their songs for next play if already in the playlist or for inclusion in the playlist as timely if not already included, or an impending weather storm might influence the playlist to songs encouraging people to get home and be safe.

If no entity of interest are identified, the process waits until entities of interest are identified. When entities of interest 924 are identified 940, a playlist 954 is assembled reflecting media associated with the entities of interest 924 and specific to their present context. For example, within a W4 COMN, if user RWEs are identified within a location associated with a business having an entertainment system, a playlist 954 may be assembled 950 containing songs that are favorite songs associated with each user RWE, which are identified using an IO relating to a topic for specific music genre that are associated with each user RWE, or are on playlists associated with each user RWE or proxy RWEs. In one embodiment, playlists are built by a playlist generation module which can be within a correlation engine within a W4 engine.

The playlists and favorite songs of all users present at the location can be compared, determining overlaps, similarities, and matching tracks or styles to create a composite playlist. The playlist can additionally be filtered using filter criteria 952 to exclude media that falls within defined categories. For example, a coffee house may choose to filter out heavy metal or rap music or music having offensive lyrics. The playlist can additionally be sorted in a specific order, for example, by artist. The playlist can additionally specify that only specific tracks or sections of selected media are played, in effect creating a real-time composite stream by mixing and re-mixing portions of multiple media files into one experience. As users come and go from the environment, their influence on the mix is added or removed and yet the real-time system responds smoothly yet quickly to change the mix according to any changes in actual population of uses and their associated interests. In one embodiment, filter criteria can be stored as an IO associated with an RWE.

Filter criteria can be dynamic and respond to changes detected by the network and can include any alteration of the presentation of the media file in response to such changes. Such alterations of the presentation of the media file can include, without limitation, excluding specific media files, varying the size and brightness of images displayed, or varying the volume of audio presented. For example, the streaming of adult content may be stopped when a proxy for an underage user is detected. If filter criteria are associated with a mobile end user device, a game content may be hidden when the user's supervisor is detected nearby, or the volume of audio may change as location of the device changes.

Filter criteria can further specify the ordering of the playlist. Ordering criteria can be based on any property associated with selected media files including real time network or co-presence/interaction data generated by present users. For example, media files relating to the favorite songs of a majority of users may be ranked first. Alternatively, ordering may be based on the rank of songs on the current billboard. Filter criteria may also be derived from implicit or explicit preferences of the location or business such as to achieve an advertising or commercial goal through the broadcast and/or distribution of playlists and media. For example, a business location may want to distribute a live or exclusive recording of an artist to users to visit their stores, but the system can sense that some users who come to the location already have that track on their portable music devices and thus the system can automatically offer them another new track from their media library so as to still give that user a positive experience at the business location.

In another example, if a user is identified as being outside a physical location associated with a business, a playlist may be assembled using songs preselected by the business to be played to passing users, and in one embodiment, the stationary media presentation device at the business location mixes short clips of the favorite songs of one or more mobile users as they pass-by the store. In a video example of that embodiment, a large display screen in a storefront window displays a composite stream or slideshow of pictures from the passing users' cell phones. The playlist may be built manually, or may be generated dynamically by including, for example, the last ten songs played within the business location, or the favorite song of its top customers. In one embodiment, the playlist may further specify that only a portion of every song is played, for example, only the first ten seconds of every selection may be played or that some media files are private and not available for public playlists or display.

In another example, if two users are found to be of interest to one another (e.g. there user or data profiles indicate a likely shared interest, they are already explicitly friends or are currently texting each other), a playlist may be constructed for both individuals which contains favorite songs common to the users, or new music likely to be of interest to both users based upon their most played or highest rated media files within their respective libraries as compared against the library of new media available to the location for immediate broadcast or distribution. If the users are romantically involved, the playlist may be filtered to include only romantic songs or if they are friends it can be filtered to exclude overtly romantic songs, or it could use their co-present data histories as correlated against media files to identify and select a media files such as a song, photos or video that has received sustained, recurring or otherwise specialized attention by both users, e.g. "they're playing our song.".

In one embodiment, within a W4 COMN, a playlist may be instantiated as a playlist IO owned by an RWE, such as for example, playlist IO 854 or 862 of FIG. 9. The playlist 10 can be transient or persistent, and can be shared by multiple users. The playlist is then used to download, stream, or otherwise deliver media 960 to a proxy RWE device associated with one or more users and/or a business. In one embodiment, a media delivery module within a W4 engine delivers media to a requesting user device In one embodiment, the process repeats periodically to determine if any new entities of interest can be identified or if any new W4 COMN data is available to influence proximity definitions or filtering criteria. If so, a new playlist is generated.

In one embodiment, the play of media on the playlist may be conditioned by sensor data that changes in real-time. For example, if a playlist is created for two individuals who are friends, the volume of music may increase as the two individuals move closer together, or it may be sensitive to other environmental factors like what other users are present, are they in a library or how much power consumption is needed to power higher levels of output.

With reference to both FIG. 8 and FIG. 9, profile data, metadata, and IOs, including playlists and media objects, can be stored and retrieved from any suitable location within a W4 COMN or a network that stores and maintains equivalent data. Such locations include, but are not limited to, a central data store, a central server, and user devices, such as portable media players, which are capable of storing data. The data could be stored in one application in one format or more likely across multiple formats, platforms and gateways for data access and verification.

Figure 11:
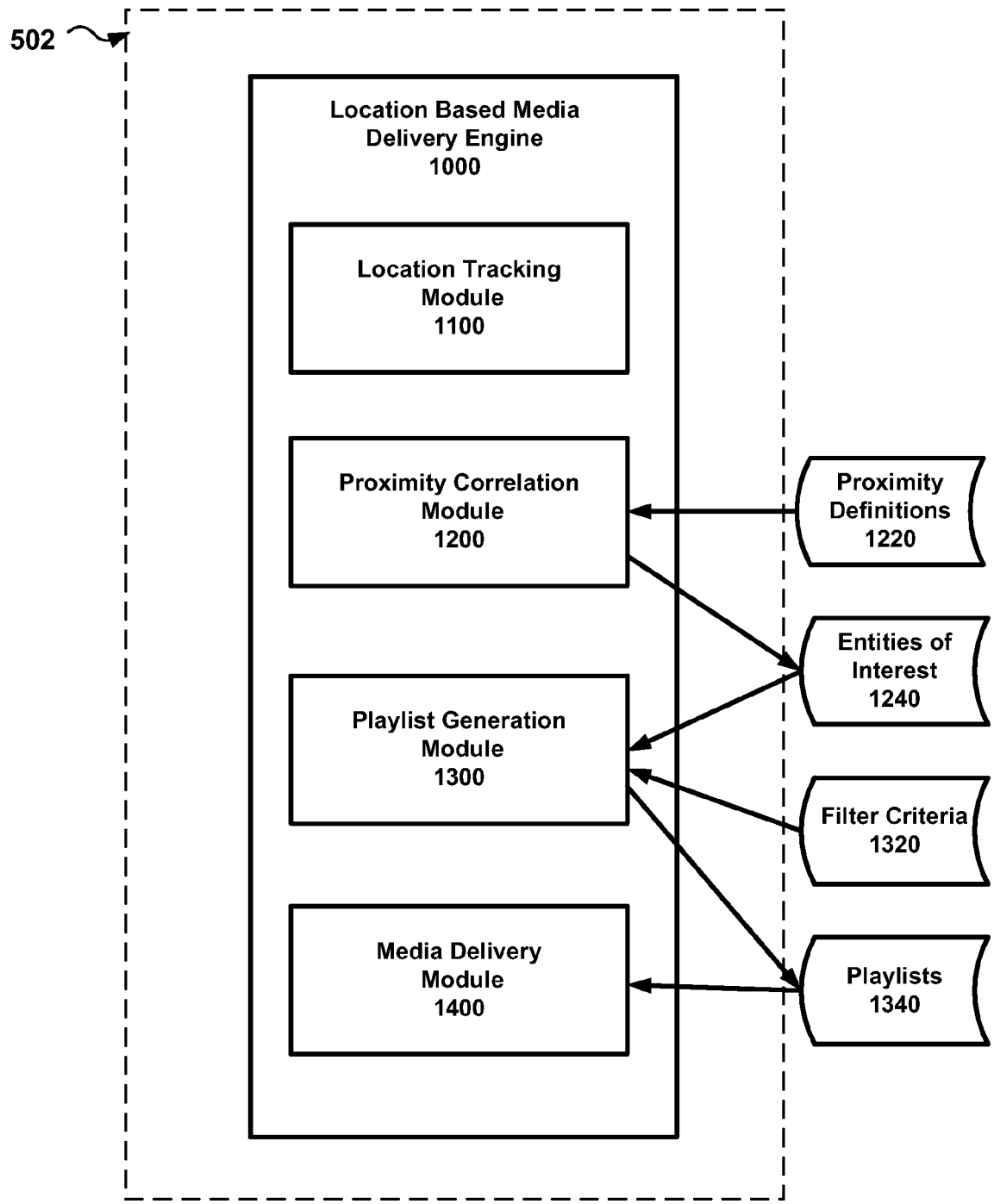
FIG. 11 illustrates one embodiment of a location based media delivery engine that is capable of providing location-based media delivery within a network.

FIG. 11 illustrates one embodiment of a location based media delivery engine 1000 that is capable of providing location-based media delivery within a network, for example, a W4 COMN. The engine includes a location tracking module 1100 that tracks the spatial location of users, businesses, and other physical entities and devices associated with such entities including their relative proximity and repetitive or otherwise interesting spatial patterns over time. The location of devices may be periodically transmitted by the user devices to the location tracking module 1100, or alternatively, the location of the devices may be periodically determined by the location tracking module, for example, by triangulation of a cellular signal or association with a device or user of known location. In one embodiment, the location based media delivery engine 1000 may be a component of a W4 engine 502 of a W4 COMN.

The location based media delivery engine 1000 further includes a proximity correlation module 1200 that determines if there are any users, businesses, and other entities that are within a defined proximity to one another. In one embodiment, proximity definitions that outline spatial and other criteria that determine when users, businesses, and other entities are of interest to one another are stored on a computer readable medium 1220. In one embodiment, the resulting lists of users, businesses, and other entities that are of interest to another user, businesses, or other entity are stored on a computer readable medium 1240. In one embodiment, the proximity correlation module 1200 can be implemented as one component of correlation engine 506 within a W4 engine 502 of a W4 COMN.

The location based media delivery engine 1000 further includes a playlist generation module 1300 that generates playlists 1340 for users, businesses, and other entities for which a list of entities of interest have been found. Playlist generation module 1300 can use data related to the entities of interest, including without limitation, profile data, playlists, favorite songs or videos, and favorite media genre, social network data, and other topical data for entities of interest to generate one or more playlists or composite streams or files, e.g. slideshow or highlight reel. Such data can be compared, determining overlaps, similarities, and matching tracks or styles to create a composite playlist. The playlist generation module 1300 can additionally filter and/or order the playlist using filter criteria 1320 stored on a computer readable medium to exclude or include media that falls within defined categories, genres, artists or sources of origin. In one embodiment, the playlist generation module 1300 playlists are built by a playlist generation module can be implemented as one component of correlation engine 506 within a W4 engine 502 of a W4 COMN.

The location based media delivery engine 1000 further includes a media delivery module 1400 that delivers media contained in playlists generated for users, businesses, and other entities by the playlist generation module 1300. In one embodiment, such media is delivered to media presentation devices associated with the entities for which the playlists were generated. In one embodiment, the delivery module 1400 can be implemented as one component of a W4 engine 502 of a W4 COMN.

In one embodiment, the media delivery module is aware of changes in real-time sensor data, for example, the changes in the physical location of an entity, and adjusts play of media on the playlist. For example, if a playlist is created for two individuals who are friends, the volume of music may increase as the two individuals move closer together and/or overlap previously playing media as a form of alert that the friend associated with that song or video is nearby.

Additional Examples of Location Based Media Delivery

The disclosure will now discuss additional examples of the above principles. The examples given below are intended to be illustrative, and not limiting.

In one example of users influencing media at a location, a Starbucks has a W4 enabled entertainment system at its location feeding the ambient music and video display systems. As a number of customers enter and leave the location with W4 enabled devices, the media server at the location plays music the current set of clients will likely prefer accompanied by personalized video displays of user-generated or associated content. As the type of customer in the store changes, the type of media played over the ambient system changes—when the high school kids are in the store it will play music which appeals to that group. When the wave of soccer moms comes in, it plays a different set, and plays yet another set on the weekend when there is a more even mix of customers.

In one embodiment, the W4 COMN has historical data on the location's customers and the system may favor the preferences of regular repeat customers, big spenders or those who spend a long time at the store. Such filtering criteria can be provided by the business owner, by the network and or by the owner of the media presentation devices and/or their agents, e.g. sponsored ad agencies In another example of users influencing media at a location, a DJ at a club is automatically delivered a list of the favorite music of the people currently in the club, e.g. it will appear on the DJ's Mixing Screen. The DJ can then select the music to play based from the list, or may select other tracks based on his personal judgment. The DJ can then create a playlist and play it. Alternatively, instead of a set of tracks, the system can instead create a base beat track and overlay samples of the tracks that the attendees may like, thus creating a completely new and unique track or composite stream, part of which will appeal to someone in the room at any one time.

In another example of users influencing media at a location, a user who has a W4 enabled entertainment system is throwing a party, but has no idea of the musical preferences of the guests. The user enters instructions to the W4 enabled entertainment system to play music which the guests will probably like, based on data gleaned from their profiles, media library and media playlists. as indicated by their local W4 enabled devices. Before guests arrive, the host sets the stereo to play. Initially, the entertainment system only plays the music the host likes.

As guests arrive, their presence is detected via their local W4 devices, their playlists and preferences of each guest are determined and add new tracks are added to the playlist or mixed into the re-mix. The host can also set filters ahead of time in order to flavor the playlist to the host's liking and the event, e.g. avoiding media with explicit lyrics or themes when children are at an event. For example, a majority of the guests may like death-metal, but the host may not wish to have it played at a sedate dinner party, and can specify categories of music to play or not play as default preferences, derived preferences based upon W4 data concerning the event and a model of event types to match every event, or explicitly entered preferences such as "no death metal.". As above, the entertainment system can be set to auto-play, or simply create a list of preferred tracks to play and allow the host modify in the final selection of which tracks to play.

In another example, imagine a scene in a film where a couple's eyes meet across a room, and romantic music starts playing in the background, and increases in volume as they move closer to each other. Such a scene could be enabled in real life using location based media delivery. For example, two single users each have their own W4 enabled device and are in the same venue, listening to their own music via headphones. A location based media delivery server detects that the two individuals are moving towards each other, it then mines both users playlists for a track that they have both tagged as "romantic" or "love".

As they move towards each other, the track begins to play simultaneously at a low volume through their respective headphones. As they move closer, the volume increases. When get close enough to touch, the music reaches a crescendo of volume and stabilizes. The server could avoid unintentionally matching incompatible persons by only providing such functionality for persons registered with an online dating service and are nominally compatible (e.g. have at least one interest in common and are close in age.)

In an example of a location influencing music heard by a user, a church defines a W4 location activated playlist containing recordings of music performed in the church during services. When a person with a W4 enabled device travels past the church on the same street, the playlist or a track from the playlist is sent to the person's W4 enabled device. Alternatively the triggering device can be social proximity such that church members devices play a track from their Church's playlist when they come into proximity of each other such that the church's music or media is presented to each user in the cluster of users in proximity, each the same media or in other embodiments, each member may be played their favorite or best-match song from the church's playlist.

Distributing Media Related to a Location

As discussed above, businesses having brick and mortar locations that service customers often use ambient music and other media at such locations to draw, retain, and entertain customers. Music has the power to create powerful emotional connections between places and people. If a person hears music they enjoy at a business location, the person may, consciously or subconsciously draw a connection between the music, the way it makes them feel, and a business where they last heard (or first heard) the song.

Such connections, however, may not last. Over time, a person may forget where they first or last experienced a song or a video. If the song or video may be short-lived in popularity, a person may never hear the song again through publically available channels. Stress and other distractions may lead a person to partially or wholly ignore a song or video the first time they see or hear it, or they may forget who the musical artist is or what the title of the song is.

Oftentimes, persons frequenting a business location would, for a variety of reasons, like to re-experience media they previously experienced at the business location in one or more times in their past. Oftentimes, a business would like to associate themselves with popular artists, songs or videos in the minds of their customers. This creates a marketing opportunity for businesses. By distributing media to customers or prospective customers of a specific business location, the business can enhance their connection with their customer base and their customers brand awareness and loyalty. Moreover, such distribution creates myriad marketing opportunities for the business by, for example, attaching ads to such media or offering free media as an incentive to purchases goods or services from the business, or being the exclusive source for specific media, e.g. live sets at the shop.

For example, suppose a customer spends a half hour browsing in a Charlotte Russe (a women's clothing store) location. The retailer chooses to play ambient music using an in-store entertainment system. A number of music tracks are played as ambient music during the period the customer is in the store. The retailer may wish to give away these music tracks to its customers for advertising or retention purposes.

If the customer has a network connected media player, as each track finishes playing, the track could be downloaded to the customer's media player creating a new playlist on the device. As the customer browses the store, more tracks play and as each track finishes playing they are added to new play list. If the customer were to look at the media player while they are in the store, they would notice the new play list, possibly labeled "Music brought to you by Charlotte Russe" and each track could be labeled "XXX brought to you by Charlotte Russe" where XXX could be the name of a featured item of merchandise. Other forms of advertising could be attached to the track as well, for example, a prefix containing an audio advertisement, as well as content restrictions, such as a maximum number of replays of a track.

Such concepts may be further extended by filtering media downloaded to the customer's media player. For example, the track may only be downloaded to the customer's media player if it the first time the customer has heard the track since if the user has heard this track or version before, the emotional connection could be lessened. Alternatively, the track may only be downloaded if the customer has a positive impression of the track or the performing artist, any emotional connection could be negated if the user has had a negative experience with this track or artist.

In one embodiment, media is only downloaded to users participating in a commercial music service. Participation in a commercial music service may constitute permission for media and associated advertisements and other content restrictions and obligations (if any) to be automatically downloaded to a user's proxy device. Participation in a commercial music service can be free or on a paid subscription basis.

The embodiments of the present invention discussed below illustrate application of the present invention within a W4 COMN. Nevertheless, it is understood that the invention can be implemented using any networked system in which is capable of tracking the physical location of users and media enabled electronic devices, and which is further capable of collecting and storing user profile data, as well as temporal, spatial, topical and social data relating to users and their devices.

Figure 12:
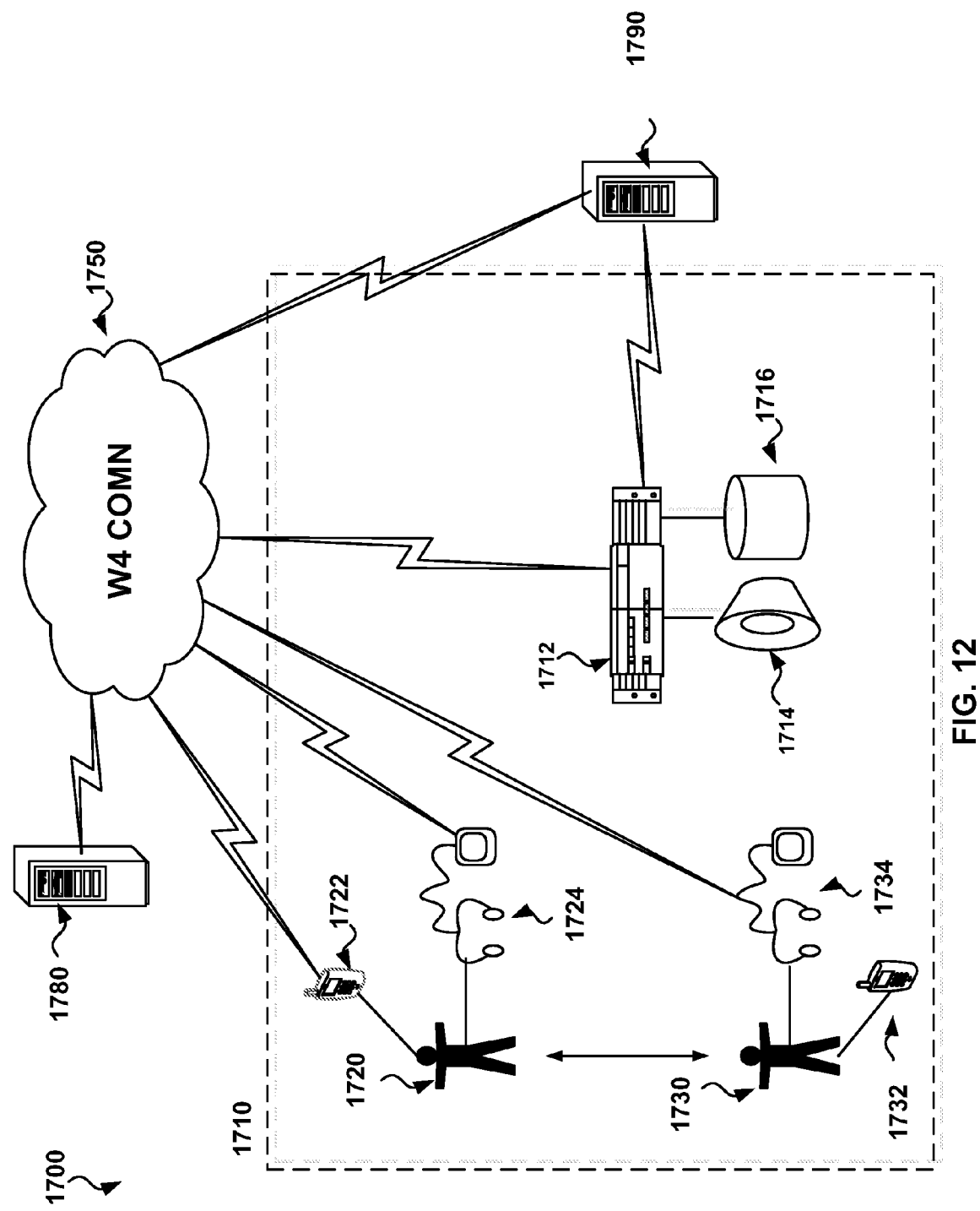
FIG. 12 illustrates one embodiment of the use of a W4 COMN for distributing media related to a location.

A W4 COMN can provide a platform that enables music or other media presented at a location to be automatically downloaded to customer's portable network-connected devices. A W4 COMN can also provide a platform to personalize music media presented at a location which is downloaded to customer's portable network-connected devices. The W4 COMN is able to achieve such a result, in part, because the W4 COMN is aware of the physical location of persons and places, and is further aware of the media preferences of such persons and places and their relationship to one another. Alternatively, users can also tag or mark an object, place or spatially bounded space in the real world as a location to present media or downloadable media FIG. 12 illustrates one embodiment of the use of a W4 COMN for distributing media related to a location.

In the illustrated embodiment, a business 1710 has a bounded physical location, such as, for example, a building, a room within a building, or an open-air location. The location 1710 has an entertainment system 1712 which includes a sound reproduction system 1714 for playing ambient music and a local storage device for storing media 1718. The business location could be a brick and mortar location of a retailer, or alternatively could be any other type of location of a business which hosts customers, such as, for example, a nightclub.

The entertainment presentation system could be additionally configured for the presentation of media including videos, images, as well as special effects such as smoke and light shows. The geographical position of the entertainment system 1712 can be determined by GPS sensors within the device or by any other position determination technique, such as triangulation of cellular signals. Alternatively, the geographical position of the device may be known through a one-time measurement or position determination.

The entertainment system 1712 plays media, such as songs or videos, during business hours. The media program could be a preprogrammed media program that presents a fixed program of music tracks or videos, could be a dynamically adjusted location based media as described above with respect to FIG. 7-11, or could be a program whose content is determined in any other way, for example, by a DJ, or supplied by a third party music service provider 1790 such as Muzak.

Within the location 1710 are two individuals 1720 and 1730 who may be existing customers of the business or prospective customers. Both of the individuals have a programmable cell phone 1722 and 1732 and a portable media player 1724 and 1734. The portable media players 1724 and 1734, and the cell phones 1722 and 1732 are capable of hosting one or more playlists and are capable of downloading, storing, and presenting media received over a network such as songs, videos, images or ringtones.

The geographical position of the cell phones 1722 and 1732 and the portable media players 1724 and 1734 can be determined by GPS sensors within the devices or by any other position determination technique, such as triangulation of cellular signals transmitted by the devices. Any of the devices may contain additional environmental sensors, such as temperature sensors, or biometric sensors, such as heart rate or blood pressure monitors.

The entertainment system 1712 and the user devices 1722, 1724, 1732, 1734 are connected to a W4 COMN through network interfaces such as cellular connections or wireless Internet connections. The devices are defined to the W4 COMN and can be considered components of the W4 COMN. The devices send and receive information from the W4 COMN.

In one embodiment, an attention engine within a W4 engine (not shown) tracks the location of devices 1712, 1724, 1732, 1734 The devices 1712, 1724, 1732, 1734, 1742, and 1744 may be capable of sending geographic position information to the attention engine, or, alternatively, the attention engine may determine the position of the devices using, for example, triangulation of cellular signals. The W4 COMN can also monitor communications sent and received by user devices and track interaction data for all the devices.

In one embodiment, media presented by the entertainment system 1712 is tracked by the W4 COMN on a real-time basis, regardless of whether the media itself originates locally on the device 1716, from a third party provider 1790 such as, for example, Muzac, or through a service provided by the W4 COMN, such as, for example, location based media delivery as described above. In one embodiment, the third party music provider is known to the W4 COMN and can provide information to the W4 COMN regarding broadcast content.

One or more data services 1780 which are external to the W4 COMN are attached to the network and provide additional data regarding entities and objects known to the W4 COMN. Examples of such data services are social networking sites, such as Facebook and media metadata sites. Such data can be used, for example, to filter media objects before delivery, as will be described in further detail below.

Figure 13:
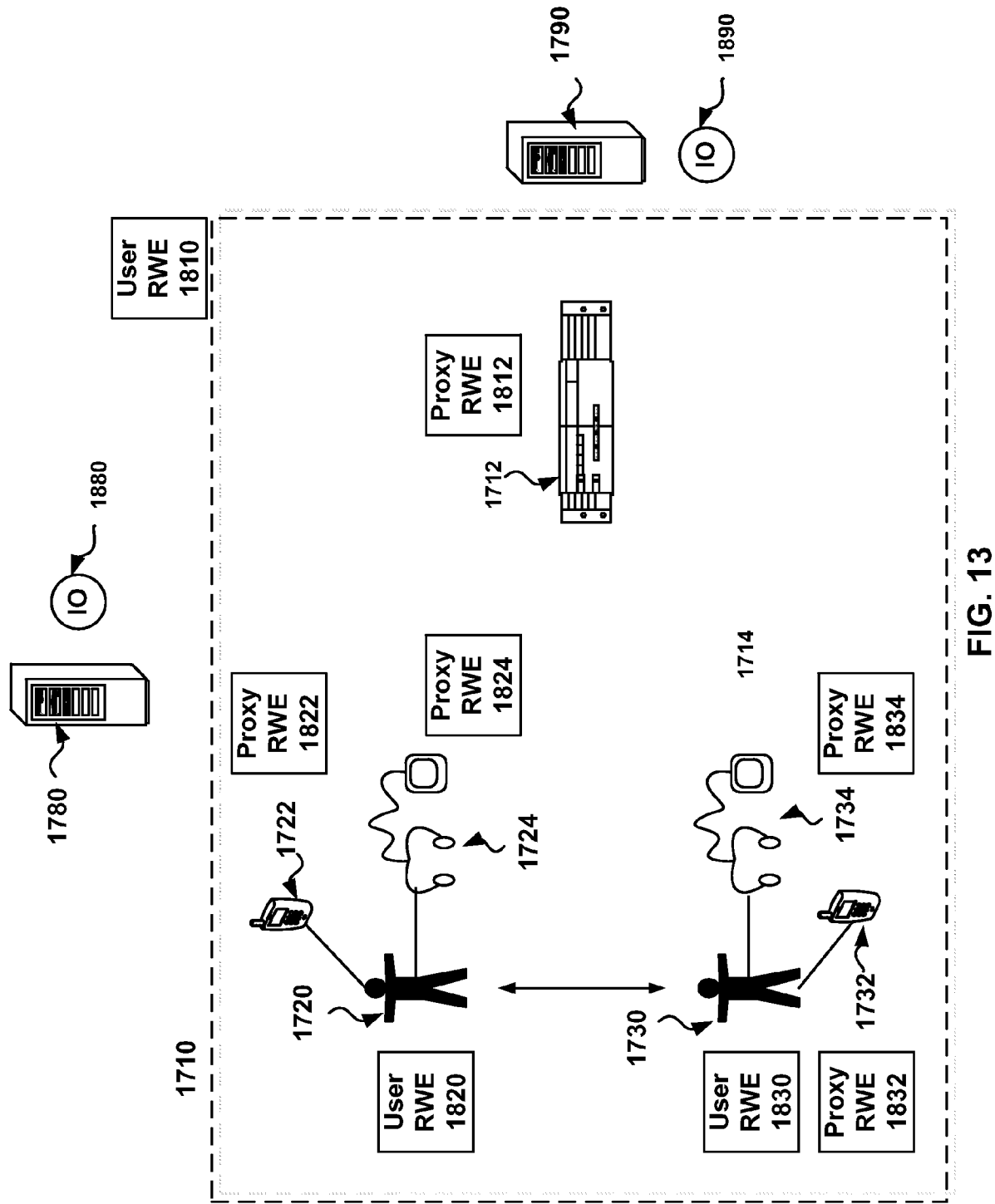
FIG. 13 illustrates one embodiment of how the users and devices shown in FIG. 12 can be defined to a W4 COMN.

FIG. 13 illustrates one embodiment of how the users and devices shown in FIG. 12 can be defined to a W4 COMN.

Individuals 1720 and 1730 are represented as user RWEs, 1820 and 1830 respectively. Each individual's devices are represented as proxy RWEs 1822, 1824, 1832 and 1834. The location 1710 is represented as a business/user RWE 1810 and the entertainment system 1712 is represented as a proxy RWE 1812. The W4 COMN collects spatial data, temporal data, RWE interaction data, IO content data (e.g., media data), and user data including explicitly-provided and deduced social and relationship data for all of the RWEs shown in FIG. 13. External data and music providers 1780 and 1790 are, in one embodiment, defined to the W4 COMN as one or more active IOs 1880 and 1890 respectively.

Figure 14:
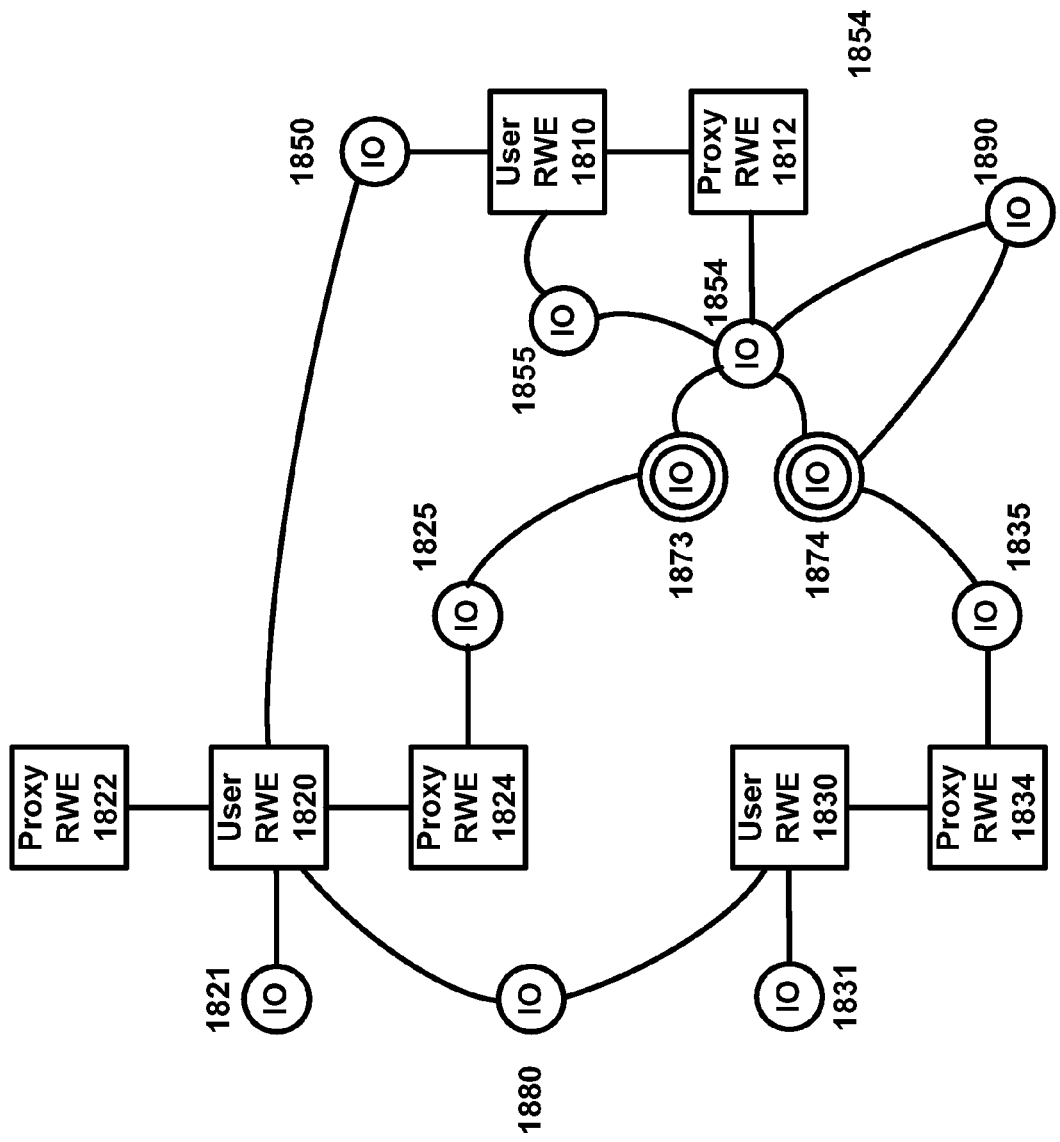
FIG. 14 illustrates one embodiment of a data model showing how the RWEs shown in FIG. 13 can be related to entities and objects within a W4 COMN.

FIG. 14 illustrates one embodiment of a data model showing how the RWEs shown in FIG. 13 can be related to entities and objects within a W4 COMN.

Each user RWE for an individual 1820, 1830 is associated with proxy RWEs 1822, 1824, 1832 and 1834 representing user devices used by the individual. For example, user 1820 is associated with proxy RWEs 1822 and 1824 corresponding to the user's cell phone and portable media device respectively. A user RWE can be associated with one or more user data IOs 1821 and 1831 which can contain, without limitation, user profile data, user demographic data, user interests, user social networks, user associations, transactions, surfing history, search history, communication events and communications content data.

The user proxy devices 1824 and 1834 are each associated with a playlist 1825 and 1835 respectively. Each playlist is associated with a media IO 1873 and 1874 respectively. The user proxy devices could be associated with multiple playlists, and each playlist could contain multiple media objects. The media objects 1873 and 1874 may be stored locally on the user proxy devices, or may be stored in other locations available to the network.

The business user RWE 1810 is associated with a proxy RWE 1812 for the businesses entertainment system. The proxy RWE 1812 is associated with a playlist 1854 containing media the business is currently presenting on the entertainment system. The playlist is associated with two media objects 1873 and 1874. The playlist 1854 and the media objects 1873 and 1874 may be supplied by a music provider 1890. Alternatively, the playlist 1854 can be generated manually or can be generated by any other automated process capable of generating a playlist. The media objects 1873 and 1874 may be stored locally on the storage devices attached to the entertainment system, or may be stored in other locations available to the network.

The individual RWE 1820 is associated with an IO for a commercial music service 1850. Association with the commercial music service, in one embodiment, constitutes permission for media objects to be downloaded to the individual's proxy devices. The business user 1810 is also associated with the commercial music service IO 1850, indicating that media objects on business's playlist 1854 are to be downloaded to proxy devices of participating user RWE 1820s (subject to filter criteria). User RWE 1830 is not participating in the commercial music service, and hence has no relation to the commercial music service IO 1850 and, in one embodiment, will not receive downloads of media objects from the playlists of participating businesses such as, for example, RWE 1810.

In the illustrated embodiment, the two user RWE 1820 and 1830 are associated with one another 1880, for example, through a social networking site. For example, the two users may be friends within a social network. Additionally, or alternatively, the user profiles associated with each user RWE 820 and 830 may list the other individual as a contact or friend. The user RWEs may also be related to each other through other IOs, for example, an IO relating to a topic (i.e. the individuals are interested in the same music.)

While user 1830 is not participating in the commercial music service, and has no relation to the commercial music service IO 850, data relating to the user 1830 can be relevant for distributing media related to a location. Media downloads to a participating user RWE 1820 may be subject to filter conditions. For example, a filter condition can be created to the effect that the participating user will not receive downloads of a music track unless it is on a friend's playlist, or that the participating user will not receive downloads of tracks unfavorably reviewed by a friend.

The business playlist 1854 or the business user 1810 (or both) may be associated with content restrictions, which, in one embodiment, may be contained in one or more content restriction IOs 1855. Content restrictions can place any condition on a media object downloaded to a user proxy device. One type of content restriction could requirement that media objects are downloaded with an attached advertisement. Another type of content restriction could be a use restriction, such as limiting the media object to a fixed number of replays.

In one embodiment, within a W4 COMN, the relationships shown in FIG. 14 are built and maintained by one or more correlation engines within a W4 engine which services the W4 COMN. The creation of such relationships may be automatic and part of the normal operation of the W4 COMN. Alternatively, certain relationships, such as creation of dynamic playlists, for example, IO 854, may be created on demand.

Figure 15:
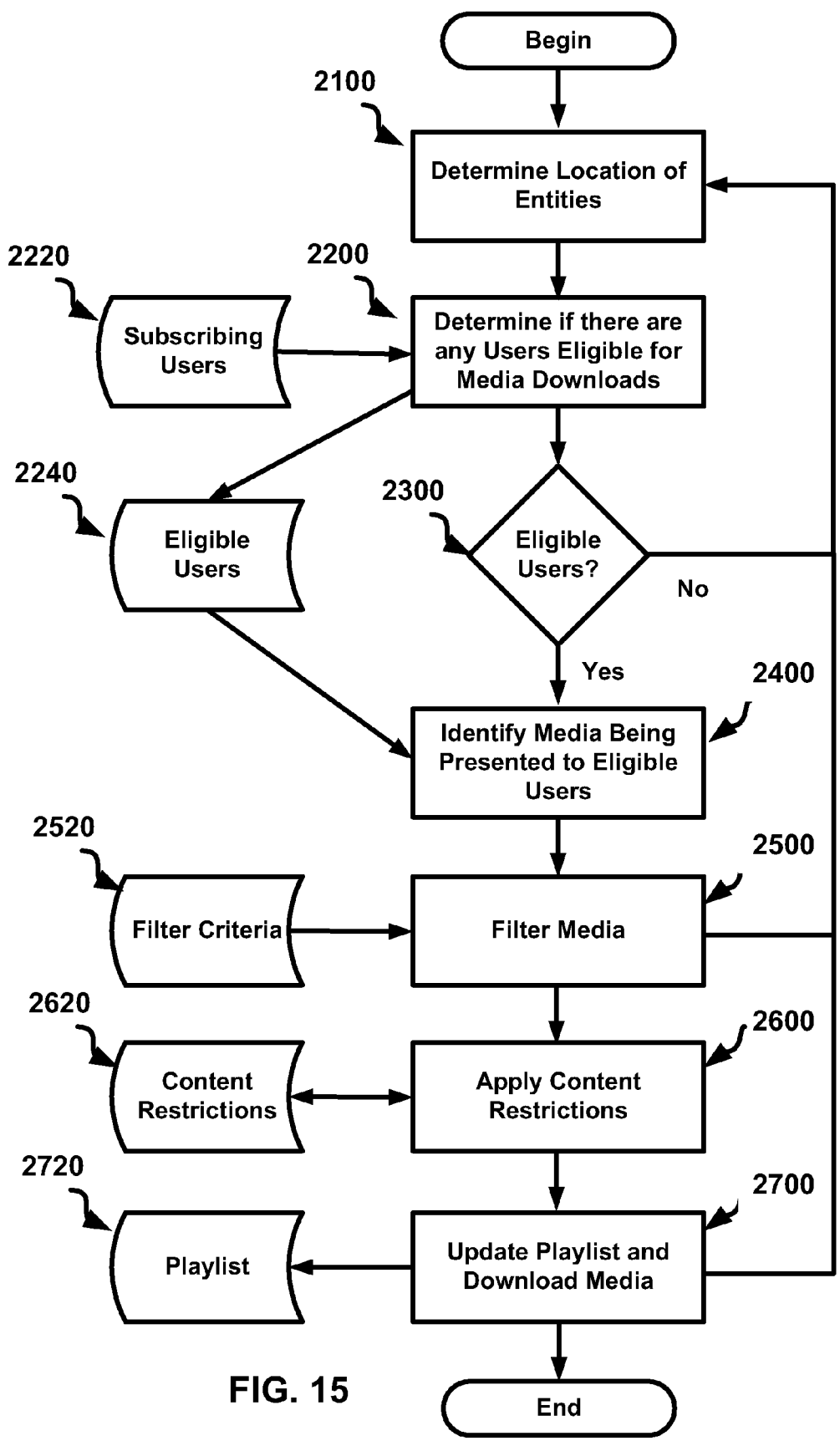
FIG. 15 illustrates one embodiment of a process 2000 of how a network, for example, a W4 COMN, can use temporal, spatial, and social data to distribute media related to a location to users known to the network.

FIG. 15 illustrates one embodiment of a process 2000 of how a network, for example, a W4 COMN, can use temporal, spatial, and social data to distribute media related to a location to users known to the network.

Spatial data (i.e. the geographic location of devices) is periodically determined 2100 for entities such as users and businesses which, within a W4 COMN, can be defined to the network as RWEs. The location of users and businesses are determined through devices, such as phones or media players, which, within a W4 COMN, may be associated with proxy RWEs. The location of devices may be periodically transmitted by the devices to the network, or alternatively, the location of devices may be periodically derived, for example, by triangulation of a cellular signal or association with another known device or user. If a user or proxy is associated with a fixed location, for example, a business, the location may be known and defined as a constant, for example, within metadata associated with a location RWE. Spatial data for such entities is thus constant.

For every business location that offers location based media distribution, it is then determined if there are any users eligible for media downloads 2200 in or near the business location. In one embodiment, only users within the physical boundaries of the business location during normal business hours can be users eligible for media downloads. In one embodiment, only users who are carrying a proxy device capable of accepting media downloads at the time they enter the location can be users eligible for media downloads.

In one embodiment, only users matching a targeting profile can be users eligible for media downloads. A targeting profile can be maintained by, or on behalf, of a national brand or other advertiser. The targeting profile can contain social, spatial, temporal and social criteria. For example, a targeting profile could be created for a brand of blue jeans and target persons in California that are shopping after 6:00 PM and who have at least one friend that has purchased the same brand of blue jeans.

If no users are eligible 2300 for media downloads are identified, the process waits until such users are identified. If at least one user eligible for media downloads 2220 is identified 2300, the current media object being presented at the business location where the users is currently located is identified 2400. In one embodiment, the process polls the media presentation device present at the business location to determine the current media object that is being presented. In one embodiment, the playlist of the media presentation device present at the business location is stored on the network as an IO.

Filter criteria 2520 are then applied to the identified media object to determine if there is any reason why the media object should not be downloaded to the eligible users' proxy devices. In one embodiment, the process checks the eligible users' "already heard" list of tracks to determine if the user has experienced the media before. If the experienced the media before, the process can do additional data mining to determine if the user has a positive or negative relationship with the media, by, for example, mining tags the user has attached to the track, or reviews and ratings that the user has given the track. If the process determines that the user would enjoy the media object based on such mining, the media object can be delivered to the eligible use.

In one embodiment, filter criteria can contain any spatial, temporal, social, or topical criteria that define media objects that should not be downloaded to an eligible users devices. For example, music of a genre which is not favored by the eligible user can filtered out (i.e. not downloaded to the end user's device.) In another example, music which was unfavorably reviewed by an eligible user's friends is filtered out. In another example, Content restrictions 2620 are then applied 2600 to identified media objects that have not been excluded by filter criteria before they are downloaded to eligible users' proxy devices. Content restrictions can be any kind of rules that condition the use of downloaded media. Such rules may limit the use of the media objects. For example, a media object may conditioned such that the user can only listen for to the media object for 3 days, can only listen to the object 20 times, or the user can only give the track to three friends.

Such rules may specify the media object is sampled or placed in an alternative form. For example, instead of sending a full track, the process could send a snippet or sample of the track and encourage the user to visit a website to receive the full track and possibly drive the user to shop the retailer online. A link or code could be built into the metadata of the track, which can possibly drive the user back to the retailer's site to redeem an online coupon for a discount on purchases. At that point the retailer can collect more information in a customer profile in order to give away more tracks or possibly the entire album. In another example, the process can deliver a sample of a track to an eligible user as a ringtone.

Such rules may also place positive requirements or obligations on the use of media objects. For example, an audio ad could be prefixed to a media object such that the user must hear or view the ad before the downloaded media object can be presented on the users media player. In another example, a media object could be conditioned such that the user must share the object with three friends.

A location specific playlist 2720 is then created or updated 2700 on the eligible user's proxy device and the media object, with content restrictions if applicable, is downloaded to the user's proxy device. In one embodiment, the playlist is updated and the media object downloaded immediately. In another embodiment, the process waits until the presentation of the media object has concluded. In another embodiment, instead of giving away the tracks while the user is browsing, the process accumulates the tracks while the user browses and only updates the play list and downloads the media objects if users purchase something over a specific value.

Figure 16:
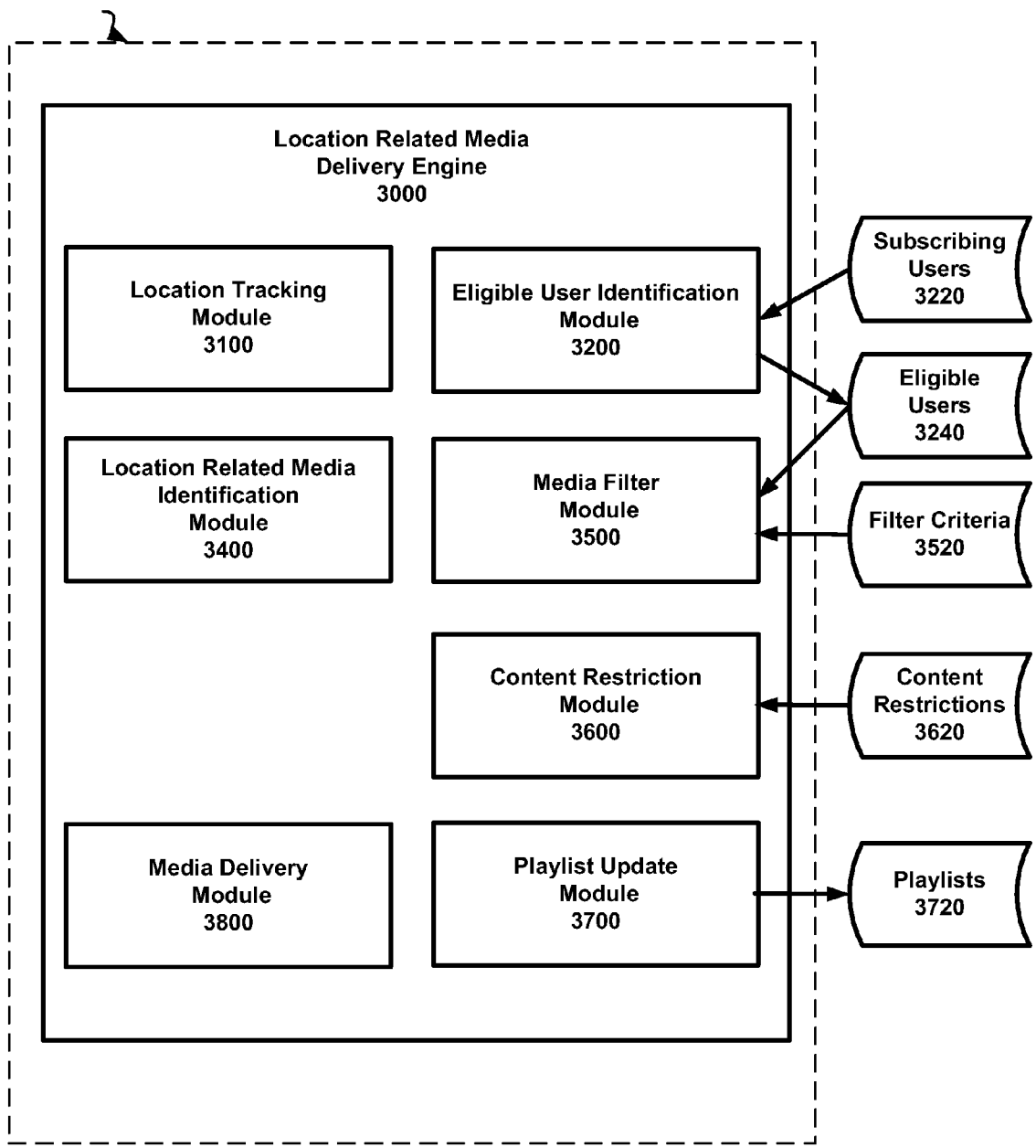
FIG. 16 illustrates one embodiment of a location related media delivery engine 3000 that is capable of providing delivering media related to a location to eligible users within a network, for example, a W4 COMN.

FIG. 16 illustrates one embodiment of a location related media delivery engine 3000 that is capable of providing delivering media related to a location to eligible users within a network, for example, a W4 COMN. In one embodiment, the location related media delivery engine 3000 may be a component of a W4 engine 502 of a W4 COMN.

The engine includes a location tracking module 3100 that tracks the spatial location of users, businesses, and other physical entities and devices associated with such entities including their relative proximity and repetitive, or otherwise interesting, spatial patterns over time. The location of devices may be periodically transmitted by the user devices to the location tracking module 3100, or alternatively, the location of the devices may be periodically determined by the location tracking module, for example, by triangulation of a cellular signal or association with a device or user or transaction or sensing event of known location.

The location related media delivery engine 3000 further includes an eligible user identification module 3200 that determines if there are any users eligible for media downloads in or near business locations offering location related media delivery. In one embodiment, only users within the physical boundaries of such business locations during normal business hours can be users eligible for media downloads. In one embodiment, only users who are carrying a proxy device capable of accepting media downloads at the time they enter the location can be users eligible for media downloads.

In one embodiment, only users subscribing 3220 to a commercial music service can be users eligible for media downloads. Users may enroll in the commercial music service through any means of communication with the provider of the commercial music service. For example, the provider of the commercial music service may allow users to enroll using a network connected proxy device, such as a media player. In one embodiment, the commercial music service may be provided at no cost to users or may be a paid subscription service. In one embodiment, when a user enters a business location that offers location based media distribution, a message or email may be automatically sent to the end user encouraging the user to enroll in the service.

The location related media delivery engine 3000 further includes a location related media identification module 3400 that identifies current media objects being presented to eligible users at business locations offering location related media delivery. In one embodiment, location related media identification module 3400 polls the media presentation device present at the business location to determine the current media object that is being presented. In one embodiment, the playlist of the media presentation device present at the business location is available to the network and is accessed by the location related media identification module 3400.

The location related media delivery engine 3000 further includes a media filter module 3500 that applies filter criteria 3520 to media objects identified by the location related media identification module 3400 to determine if there is any reason why such media object should not be downloaded to the eligible users' proxy devices. In one embodiment, the eligible media filter module 3500 checks the eligible users' 3240 "already heard" list of tracks to determine if users have experienced the media before. If the users have experienced the media before, the module can do additional data mining to determine if the user has a positive or negative relationship with the media, by, for example, mining tags the user has attached to the track, or reviews and ratings that the user has given the track. If the module determines that the user would enjoy the media object based on such mining, the media object can be delivered to the eligible users.

In one embodiment, filter criteria can contain any spatial, temporal, social, or topical criteria that define media objects that should not be downloaded to an eligible users devices. For example, music of a genre which is not favored by the eligible user is filtered out and not downloaded to the end user's device. In another example, music which was unfavorably reviewed by an eligible user's friends is filtered out. In another example.

The location related media delivery engine 3000 further includes a content restriction module 3600 that applies content restrictions 3620 to filtered media objects before they are downloaded to eligible users' proxy devices. Content restrictions can be any kind of rules that condition the use of downloaded media. Such rules may limit the use of the media objects. For example, a media object may conditioned such that the user can only listen for to the media object for 3 days, can only listen to the object 20 times, or the user can only give the track to three friends Such rules may specify the media object is sampled or placed in an alternative form. For example, instead of sending a full track, the process could send a snippet or sample of the track and encourage the user to visit a website to receive the full track and possibly drive the user to shop the retailer online. A link or code could be built into the metadata of the track, which could possibly drive the user back to the retailer's site to redeem an online coupon for a discount on purchases. At that point the retailer can collect more information in a customer profile in order to give away more tracks or possibly the entire album. In another example, the process can deliver a sample of a track to an eligible user as a ringtone.

Such rules may also place positive requirements or obligations on the use of media objects. For example, an audio ad could be prefixed to a media object such that the user must hear or view the ad before the downloaded media object can be presented on the users media player. In another example, a media object could be conditioned such that the user must share the object with three friends.

The location related media delivery engine 3000 further includes a playlist update module 3700 that creates or updates location specific playlists 3720 on user proxy devices. In one embodiment, the playlist update module 3700 updates the playlists 3720 immediately. In another embodiment, playlist update module 3700 waits until the presentation of the media object has concluded before updating the playlists 3720. In another embodiment, instead of giving away the tracks while the user is browsing, the playlist update module 3700 accumulates the tracks while the user browses and only updates the playlist if users purchase something over a specific value.

The location related media delivery engine 3000 further includes a media delivery module 3800 that delivers media objects, possibly including content restrictions, to user proxy devices. In one embodiment, the media delivery module 3800 delivers media objects immediately. In another embodiment, the media delivery module 3800 waits until the presentation of the media object has concluded delivering the media objects. In another embodiment, instead of giving away the media objects away while the user is browsing, the media delivery module 3800 accumulates the tracks while the user browses and only downloads the media objects to the user's proxy device if users purchase something over a specific value.

In one embodiment, as a track or other media object is being transmitted to a user proxy device, the display on the device could display "You're Getting A Free Track From Retailer X". The track can be labeled with the Artist/Track information as usual, additionally sponsorship information is attached to the track. If the user were to look at the device while they are in the store, they would notice the new play list, possibly labeled "Music brought to you by Retailer X" and each track could be labeled "[Merchandise Item] brought to you by Retailer X". If a user enters multiple locations sponsoring location related media delivery, the users playlists can fill up with media from the various stores, all labeled by the store the media was experienced in.

Media objects may be delivered using any delivery method supported by user proxy devices. For example, media objects may be delivered as actual media files, or as HTTP links to streaming media services. Once the media object has been delivered to an eligible user, it will reside in the users typical storage location for replay at will, unless content restrictions have been applied to the media object.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising of: receiving the physical location of a media presentation device over a network; identifying, via the network, the physical location of a plurality of end users, such that each of plurality of users is associated with a respective user device capable of storing media files; identifying, via the network, at least one of the plurality of end users who is located in such proximity to the media presentation device that the user can perceive media that is presented on the media presentation device; identifying, via the network, at least one media file that is currently being presented on the media presentation device; accumulating, via the network, a playlist comprising the at least one media file; determining, via the network, if each of the at least one of the plurality of end users made a purchase at the physical location; transmitting, over the network, the playlist to the respective user device of each of the at least one of the plurality of end users that made a purchase.

2. The method of claim 1 comprising the additional step of:
determining, via the network, if the at least one of the plurality of end users is eligible to receive a transmission of the at least one media file, wherein if the at least one of the plurality of end users is not eligible, the at least one media file is not transmitted to the at least one of the plurality of end users.

3. The method of claim 2 wherein the at least one of the plurality of end users is eligible to receive a transmission of the at least one media file if the media presentation device is located in a business location and the at least one of the plurality of end users is present in the business location during normal business hours.

4. The method of claim 2 wherein the at least one of the plurality of end users is eligible to receive a transmission of the at least one media file if the least one of the plurality of end users is carrying the user device capable of storing media files.

5. The method of claim 2 wherein the at least one of the plurality of end users is eligible to receive a transmission of the at least one media file if the least one of the plurality of end users is a subscriber of a media service.

6. The method of claim 2 wherein the at least one of the plurality of end users is eligible to receive a transmission of the at least one media file if the at least one of the plurality of end users matches a targeting profile having social, spatial, temporal and topical targeting criteria.

7. The method of claim 6 wherein the targeting profile relates to a national brand.

8. The method of claim 6 wherein the targeting profile relates to an advertiser.

9. The method of claim 1 comprising the additional step of:
determining, via the network, if the at least one media file meets at least one filter criteria, wherein if the at least one of the plurality of end users meets the at least one filter criteria, the at least one media file is not transmitted to the at least one of the plurality of end users.

10. The method of claim 9 wherein the at least one filter criteria is that the at least one of the plurality of end users has previously perceived a presentation of the at least one media file.

11. The method of claim 9 wherein the at least one filter criteria is that the at least one of the plurality of end users has previously perceived a presentation of the at least one media file and has unfavorable reviewed the media file.

12. The method of claim 9 wherein the at least one filter criteria is that at least one other user has unfavorably reviewed the media file.

13. The method of claim 1 comprising the additional step of:
determining, via the network, if at least one content restriction should be applied to the at least one media file, wherein if the at least one content restriction should be applied to the at least one media file, the at least one content restriction is applied to the at least one media file before it is transmitted to the user device of each of the at least one of the plurality of end users.

14. The method of claim 13 wherein the at least one content restriction restricts the number of times the media file can be perceived by the end user.

15. The method of claim 13 wherein the at least one content restriction restricts the number of times the media file can be presented on the user device of each of the at least one of the plurality of end users.

16. The method of claim 13 wherein the at least one content restriction restricts the duration for which the at least one media file can be presented on the user device of each of the at least one of the plurality of end users.

17. The method of claim 13 wherein the at least one content restriction restricts the number of times the at least one media file can be shared by each of the at least one of the plurality of end users.

18. The method of claim 13 wherein the at least one content restriction is at least one advertisement.

19. The method of claim 1 wherein the step of transmitting, over the network, the at least one media file comprises the steps of:
updating, over the network, a playlist on the user device of each of the at least one of the plurality of end users, wherein each playlist is updated to reflect the at least one media file;
transmitting, over the network, the at least one media file to the user device of each of the at least one of the plurality of end users.

20. The method of claim 1 wherein the at least one media file is a hyperlink.

21. The method of claim 1 wherein the at least one media file is a ringtone.

22. The method of claim 1 wherein the at least one media file is selected from the list: audio, video file.

23. The method of claim 1 wherein the at least one media file is selected from the list: product brochure, service brochure, marketing materials.

24. A non-transitory computer-readable storage medium having computer-executable instructions for a method comprising the steps of:
receiving the physical location of a media presentation device over a network;
identifying, via the network, the physical location of a plurality of end users, such that each of plurality of users is associated with a respective user device capable of storing media files;
identifying, via the network, at least one of the plurality of end users who is located in such proximity to the media presentation device that the user can perceive media that is presented on the media presentation device;

identifying, via the network, at least one media file that is currently being presented on the media presentation device;

accumulating, via the network, a playlist comprising the at least one media file;

determining, via the network, if each of the at least one of the plurality of end users made a purchase at the physical location;

transmitting, over the network, the playlist comprising the at least one media file to the respective user device of each of the at least one of the plurality of end users that have made a purchase.

25. The non-transitory computer-readable storage medium of claim 24 comprising the additional step of:

determining, via the network, if the at least one of the plurality of end users is eligible to receive a transmission of the at least one media file, wherein if the at least one of the plurality of end users is not eligible, the at least one media file is not transmitted to the at least one of the plurality of end users.

26. The non-transitory computer-readable storage medium of claim 25 wherein the at least one of the plurality of end users is eligible to receive a transmission of the at least one media file if the media presentation device is located in a business location and the at least one of the plurality of end users is present in the business location during normal business hours.

27. The non-transitory computer-readable storage medium of claim 25 wherein the at least one of the plurality of end users is eligible to receive a transmission of the at least one media file if the least one of the plurality of end users is carrying the user device capable of storing media files.

28. The non-transitory computer-readable storage medium of claim 25 wherein the at least one of the plurality of end users is eligible to receive a transmission of the at least one media file if the least one of the plurality of end users is a subscriber of a media service.

29. The non-transitory computer-readable storage medium of claim 24 wherein the at least one of the plurality of end users is eligible to receive a transmission of the at least one media file if the at least one of the plurality of end users matches a targeting profile having social, spatial, temporal and topical targeting criteria.

30. The non-transitory computer-readable storage medium of claim 29 wherein the targeting profile relates to a national brand.

31. The non-transitory computer-readable storage medium of claim 29 wherein the targeting profile relates to an advertiser.

32. The non-transitory computer-readable storage medium of claim 24 comprising the additional step of:

determining, via the network, if the at least one media file meets at least one filter criteria, wherein if the at least one of the plurality of end users meets the at least one filter criteria, the at least one media file is not transmitted to the at least one of the plurality of end users.

33. The non-transitory computer-readable storage medium of claim 32 wherein the at least one filter criteria is that the at least one of the plurality of end users has previously perceived a presentation of the at least one media file.

34. The non-transitory computer-readable storage medium of claim 32 wherein the at least one filter criteria is that the at least one of the plurality of end users has previously perceived a presentation of the at least one media file and has unfavorable reviewed the media file.

35. The non-transitory computer-readable storage medium of claim 24 wherein the at least one filter criteria is that at least one other user has unfavorably reviewed the media file.

36. The non-transitory computer-readable storage medium of claim 24 comprising the additional step of:

determining, via the network, if at least one content restriction should be applied to the at least one media file, wherein if the at least one content restriction should be applied to the at least one media file, the at least one content restriction is applied to the at least one media file before it is transmitted to the user device of each of the at least one of the plurality of end users.

37. The non-transitory computer-readable storage medium of claim 36 wherein the at least one content restriction restricts the number of times the media file can be perceived by the end user.

38. The non-transitory computer-readable storage medium of claim 36 wherein the at least one content restriction restricts the number of times the media file can be presented on the user device of each of the at least one of the plurality of end users.

39. The non-transitory computer-readable storage medium of claim 36 wherein the at least one content restriction restricts the duration for which the at least one media file can be presented on the user device of each of the at least one of the plurality of end users.

40. The non-transitory computer-readable storage medium of claim 36 wherein the at least one content restriction restricts the number of times the at least one media file can be shared by each of the at least one of the plurality of end users.

41. The non-transitory computer-readable storage medium of claim 36 wherein the at least one content restriction is at least one advertisement.

42. The non-transitory computer-readable storage medium of claim 24 wherein the step of transmitting, over the network, the at least one media file comprises the steps of:

updating, over the network, a playlist on the user device of each of the at least one of the plurality of end users, wherein each playlist is updated to reflect the at least one media file;

transmitting, over the network, the at least one media file to the user device of each of the at least one of the plurality of end users.

43. The non-transitory computer-readable storage medium of claim 24 wherein the at least one media file is a hyperlink.

44. The non-transitory computer-readable storage medium of claim 24 wherein the at least one media file is a ringtone.

45. The non-transitory computer-readable storage medium of claim 24 wherein the at least one media file is selected from the list: audio, video file.

46. The non-transitory computer-readable storage medium of claim 24 wherein the at least one media file is selected from the list: product brochure, service brochure, marketing materials.

47. A computing device comprising:

a processor;

a storage medium for tangibly storing thereon program logic for execution by the processor, the program logic comprising:

location tracking logic executed by the processor for receiving, over a network, the physical location of a plurality of media presentation devices and the physical location of a plurality of end users, such that each of plurality of users are associated with a respective user device capable of storing media files;

eligible user identification logic executed by the processor for identifying at least one of the plurality of end users who are located in such proximity to at least one of the plurality of media presentation devices that the at least one of the plurality of end users can perceive media that is presented on the at least one of the plurality of media presentation devices;

location related media identification logic executed by the processor for identifying at least one media file that is currently being presented on the at least one of the plurality of media presentation devices;

media filter logic executed by the processor for determining if the at least one media file meets at least one filter criteria, wherein if the at least one of the plurality of end users meets the at least one filter criteria, the at least one media file is not transmitted to the at least one of the plurality of end users by the media delivery module;

content restriction logic executed by the processor for determining if at least one content restriction should be applied to the at least one media file, wherein if the at least one content restriction should be applied to the at least one media file, the at least one content restriction is applied to the at least one media file before it is transmitted to the user device of the at least one of the plurality of end users by the media delivery module, the at least one content restriction applied to the media file comprises a determination that the at least one of the plurality of end users has made a purchase at the physical location;

playlist update logic executed by the processor for accumulating a playlist comprising the at least one media file and updating a playlist on the user device of the at least one of the plurality of end users, wherein the playlist updated to reflect the at least one media file upon the at least one content restriction being satisfied;

media delivery logic executed by the processor for transmitting, over the network, the at least one media file to the respective user device of the at least one of the plurality of end users upon the at least one of the plurality of end users making a purchase at the physical location.

48. The computing device of claim 47 wherein the eligible user identification logic determines if the at least one of the plurality of end users is eligible to receive a transmission of the at least one media file, wherein if the at least one of the plurality of end users is not eligible, the at least one media file is not transmitted to the at least one of the plurality of end users by the media delivery module.

49. The computing device of claim 48 wherein the at least one of the plurality of end users is eligible to receive a transmission of the at least one media file if the media presentation device is located in a business location and the at least one of the plurality of end users is present in the business location during normal business hours.

50. The computing device of claim 48 wherein the at least one of the plurality of end users is eligible to receive a transmission of the at least one media file if the least one of the plurality of end users is carrying the user device capable of storing media files.

51. The computing device of claim 48 wherein the at least one of the plurality of end users is eligible to receive a transmission of the at least one media file if the least one of the plurality of end users is a subscriber of a media service.

52. The computing device of claim 48 wherein the at least one of the plurality of end users is eligible to receive a transmission of the at least one media file if the at least one of the plurality of end users matches a targeting profile having social, spatial, temporal and topical targeting criteria.

53. The computing device of claim 52 wherein the targeting profile relates to a national brand.

54. The computing device of claim 52 wherein the targeting profile relates to an advertiser.

55. The computing device of claim 47 wherein the at least one filter criteria is that the at least one of the plurality of end users has previously perceived a presentation of the at least one media file.

56. The computing device of claim 47 wherein the at least one filter criteria is that the at least one of the plurality of end users has previously perceived a presentation of the at least one media file and has unfavorable reviewed the media file.

57. The computing device of claim 47 wherein the at least one filter criteria is that at least one other user has unfavorably reviewed the media file.

58. The computing device of claim 47 wherein the at least one content restriction restricts the number of times the media file can be perceived by the end user.

59. The computing device of claim 47 wherein the at least one content restriction restricts the number of times the media file can be presented on the user device of each of the at least one of the plurality of end users.

60. The computing device of claim 47 wherein the at least one content restriction restricts the duration for which the media file can be presented on the user device of each of the at least one of the plurality of end users.

61. The computing device of claim 47 wherein the at least one content restriction restricts the number of times the at least one media file can be shared by each of the at least one of the plurality of end users.

62. The computing device of claim 47 wherein the at least one content restriction is at least one advertisement.

63. The computing device of claim 47 wherein the at least one media file is a hyperlink.

64. The computing device of claim 47 wherein the at least one media file is a ringtone.

65. The computing device of claim 47 wherein the at least one media file is selected from the list: audio, video file.

66. The computing device of claim 47 wherein the at least one media file is selected from the list: product brochure, service brochure, marketing materials.

* * * * *